(12) United States Patent
Katayama et al.

(10) Patent No.: US 7,383,687 B2
(45) Date of Patent: Jun. 10, 2008

(54) REGENERATOR METHOD FOR MANUFACTURING REGENERATOR, SYSTEM FOR MANUFACTURING REGENERATOR AND STIRLING REFRIGERATING MACHINE

(75) Inventors: Hiroyuki Katayama, Nara (JP); Yoshiaki Ogura, Sakai (JP)

(73) Assignee: Sharp Kabushiki Kaisha, Osaka-shi Osaka (JP)

( * ) Notice: Subject to any disclaimer, the term of this patent is extended or adjusted under 35 U.S.C. 154(b) by 441 days.

(21) Appl. No.: 10/532,826

(22) PCT Filed: Mar. 24, 2003

(86) PCT No.: PCT/JP03/03548

§ 371 (c)(1),
(2), (4) Date: Apr. 26, 2005

(87) PCT Pub. No.: WO2004/040206

PCT Pub. Date: May 13, 2004

(65) Prior Publication Data

US 2006/0048521 A1    Mar. 9, 2006

(30) Foreign Application Priority Data

Oct. 31, 2002 (JP) ............................. 2002-318232

(51) Int. Cl.
*F25B 9/00* (2006.01)
*F23L 15/02* (2006.01)

(52) U.S. Cl. ................................. 62/6; 165/4

(58) Field of Classification Search ........... 62/6; 165/4

See application file for complete search history.

(56) References Cited

U.S. PATENT DOCUMENTS

| | | | | |
|---|---|---|---|---|
| 2,899,381 | A * | 8/1959 | Jonkers | 62/6 |
| 2,958,935 | A * | 11/1960 | Bloem | 29/890.034 |
| 3,445,910 | A * | 5/1969 | Duryee et al. | 29/890.034 |
| 5,429,177 | A * | 7/1995 | Yaron et al. | 165/10 |
| 5,746,269 | A * | 5/1998 | Torii et al. | 165/10 |
| 6,003,320 | A | 12/1999 | Okamura et al. | |
| 6,456,898 | B1 * | 9/2002 | Modesto et al. | 700/206 |
| 6,474,075 | B1 * | 11/2002 | Tanaka et al. | 62/6 |
| 6,544,628 | B1 * | 4/2003 | Aull et al. | 428/179 |
| 6,640,427 | B2 * | 11/2003 | Aull et al. | 29/796 |
| 6,745,822 | B1 * | 6/2004 | Mitchell | 165/10 |
| 2005/0011632 | A1 * | 1/2005 | Tanaka et al. | 165/4 |

FOREIGN PATENT DOCUMENTS

| | | |
|---|---|---|
| EP | 0 694 747 A2 | 1/1996 |
| GB | 2 109 525 A | 6/1983 |
| JP | 62-118048 A | 5/1987 |

(Continued)

*Primary Examiner*—William C Doerrler
(74) *Attorney, Agent, or Firm*—Birch, Stewart, Kolasch & Birch, LLP

(57) ABSTRACT

In a regenerator to be formed by winding a resin film into a cylindrical shape, a projection is formed on a surface of the resin film by subjecting the resin film in itself to plastic deformation, either by stamping or by laser beam irradiation. Thereafter, the resin film is stacked. The projection provides a gap between layers of the stacked resin film to be a flow passage for a working gas. Thus, a regenerator of high heat exchange efficiency is provided with ease and at low cost.

6 Claims, 19 Drawing Sheets

FOREIGN PATENT DOCUMENTS

| | | |
|---|---|---|
| JP | 8-94275 A | 4/1996 |
| JP | 10-115472 A | 5/1998 |
| JP | 10-185339 A | 7/1998 |
| JP | 2000-220897 A | 8/2000 |
| JP | 2002-137291 A | 5/2002 |
| JP | 2002-168538 A | 6/2002 |
| JP | 2003-21412 A | 1/2003 |
| WO | WO-00/16029 A1 | 3/2000 |
| WO | WO-03/019086 A1 | 3/2003 |

\* cited by examiner

REGENERATOR METHOD FOR MANUFACTURING REGENERATOR, SYSTEM FOR MANUFACTURING REGENERATOR AND STIRLING REFRIGERATING MACHINE

BACKGROUND OF THE INVENTION

1. Field of the Invention

The present invention relates to a regenerator formed by stacking a film-shaped resin material, an apparatus for manufacturing the regenerator, and a Stirling refrigerator provided with the regenerator.

2. Description of the Related Art

In recent years, Stirling engines have attracted attention from the standpoint of energy saving, environmental protection and the like. The Stirling engine is an external combustion engine that realizes a reversible, Stirling cycle utilizing an external heat source, which is advantageous in terms of energy saving and low pollution compared to the internal combustion engine that requires fuel excellent in inflammability as well as ignitionability such as gasoline.

A Stirling refrigerator is widely known as an application of the Stirling engine. The Stirling refrigerator uses a reversed Stirling cycle to generate cryogenic temperatures. Hereinafter, a structure of the Stirling refrigerator is explained with reference to the drawings.

As shown in FIG. 22, a Stirling refrigerator includes a cylinder 20 having an interior filled with an inactive gas such as hydrogen or helium as the working gas. Fitted in cylinder 20 are a piston 27 and a displacer 26, which divide the space within cylinder 20 into a compression space 28 and an expansion space 29. Piston 27 is driven by a linear motor 30. Piston 27, connected via a spring 32 to a body casing 23, periodically moves in cylinder 20 in a sinusoidal manner. Displacer 26, receiving the force of the sinusoidal movement of piston 27, reciprocates in cylinder 20. Since displacer 26 is also connected via a spring 31 to body casing 23, it periodically moves in a sinusoidal manner. In a normal operation, the sinusoidal movements of piston 27 and displacer 26 occur at the same period, with a constant phase difference.

A regenerator 15 is arranged between compression space 28 and expansion space 29. The two spaces are connected to each other via regenerator 15, to constitute a closed thermal circuit within the refrigerator. A heat-dissipation heat exchanger 24 is attached to the compression space 28 side of the closed thermal circuit, and a heat dissipater 22 is provided next to heat-dissipation heat exchanger 24. A heat-absorption heat exchanger 25 is attached to the expansion space 29 side of the closed thermal circuit, and a heat absorber 21 is provided next to heat-absorption heat exchanger 25.

The working gas within the closed thermal circuit flows in accordance with the movements of piston 27 and displacer 26, to realize the reversed Stirling cycle. Here, heat dissipater 22 serves to radiate heat within compression space 28 to the outside, and heat-dissipation heat exchanger 24 accelerates the radiation. Heat absorber 21 serves to absorb the external heat into expansion space 29, and heat-absorption heat exchanger 25 promotes the heat absorption.

An operation of a Stirling refrigerator having the above-described configuration is now explained. Firstly, linear motor 30 is activated to drive piston 27. Piston 27 driven by linear motor 30 approaches displacer 26, thereby compressing the working gas within compression space 28. Although this increases the temperature of the working gas within compression space 28, the heat generated in compression space 28 is rejected to the outside by heat dissipater 22 via heat-dissipation heat exchanger 24, so that the working gas within compression space 28 is maintained at approximately a constant temperature. This constitutes the isothermal compression process of the reversed Stirling cycle.

Next, the working gas compressed by piston 27 within compression space 28 flows, by its own pressure, into regenerator 15 and further to expansion space 29. At this time, the heat of the working gas is accumulated in regenerator 15. This constitutes the isochoric cooling process of the reversed Stirling cycle.

Subsequently, the high-pressure working gas flown into expansion space 29 expands, with displacer 26 moving downward. Although the temperature of the working gas within expansion space 29 lowers, the external heat is introduced into expansion space 29 by heat absorber 21 via heat-absorption heat exchanger 25, so that the interior of expansion space 29 is maintained at approximately a constant temperature. This constitutes the isothermal expansion process in the reversed Stirling cycle.

As displacer 26 begins to move upward, the working gas within expansion space 29 passes through regenerator 15 and returns to compression space 28. At this time, the heat having been accumulated in regenerator 15 is transferred to the working gas, thereby increasing the temperature of the working gas. This constitutes the isochoric heating process of the reversed Stirling cycle.

The sequence of processes (of isothermal compression—isochoric cooling—isothermal expansion—isochoric heating) is repeated to constitute the reversed Stirling cycles. As a result, heat absorber 21 gradually cools down, to finally reach a cryogenic temperature.

The regenerator is now explained in detail. The regenerator is a kind of heat exchanger, as described above, which transmits the heat to and from the working gas flowing therein. As such, it is necessary to secure a greater contact area with the working gas within the limited space. A complicated passage configured to secure the large contact area, however, will increase resistance with respect to the flow of the working gas, leading to degradation in efficiency of the Stirling refrigerator. That is, it is preferable for the internal structure of the regenerator that the heat transfer area in contact with the working gas is large while the flow resistance is low. Accordingly, a variety of fin structures have conventionally been proposed for the regenerator.

Among them, a regenerator formed by winding a film-shaped resin member (hereinafter, also simply referred to as "resin film") into a cylindrical shape is known (see, e.g., Japanese Patent Laying-Open No. 2000-220897). FIG. 23A is a developed view of such a generator formed by winding a resin film in to a cylindrical shape. FIG. 23B is an end face view of the resin film in an unfolded state. FIG. 24A is a developed view of another regenerator formed by winding a resin film into a cylindrical shape, and FIG. 24B is an end face view of the other generator in an extended state. As shown in the figures, the regenerator of this type is provided with a plurality of dimples 41, 42 on one side of the sheet of resin film 8. When resin film 8 having dimples 41, 42 formed thereon are wound, gaps are formed between the layers of the resin film. The stacked layers of the resin film are separated from each other, thereby constituting part of the flow passage for the working gas.

Conventionally, dimples 41 of the regenerator of this type have been formed either by bonding spacers as additional members at regular intervals on a surface of resin film 8 extended in a sheet, or by performing silkscreen printing at regular intervals on a surface of resin film 8 extended in a sheet.

Production of a regenerator of this configuration is much easier than in the case of providing metallic fins. The cost required for production of the generator is considerably reduced as well. It is noted that the surface of the sheet resin film is often coated with a metal material, to improve heat exchange efficiency of the regenerator.

In general, the dimples formed on the surface of the resin film take a regular pattern from the standpoint of ease of manufacture. For example, dimples 41 are often arranged in stripes on resin film 8 as shown in FIG. 23A, or in a matrix as shown in FIG. 24A.

A way of mounting the regenerator configured as above to a Stirling refrigerator having the above-described structure is now explained. Referring to FIG. 25, a regenerator 15 to be incorporated into the Stirling refrigerator is formed with a resin film 8 wound around a bobbin (also called a stuffer) 14 constituting part of a cylinder 20 in which a displacer is fitted. Resin film 8 may have a part secured to bobbin 14, or may be wound freely without being secured.

Regenerator 15, configured by winding resin film 8 around bobbin 14, is inserted in an outer case 33 mounted in advance to a case body 23. In this case, regenerator 15 may be arranged such that the axis line of wound resin film 8 is approximately parallel to the flow direction of the working gas, to enable the working gas to flow within the flow passage formed by the projections as described above. Further, a heat absorber 21 is attached from above, so that a closed circuit is formed in the Stirling refrigerator, with regenerator 15 secured in place.

In the case where the projections are formed by bonding spacers to the surface of the resin film, the work is very burdensome. Generally, very fine spacers are bonded to the surface of the resin film in order to secure a greater heat transfer area with the working gas within the regenerator. This involves various problems that the bonding work in itself is troublesome, that accuracy of bonding position is low, that dust or dirt may be introduced during the bonding work, and that the use of an adhesive cannot guarantee high reliability over a long period of time.

In the case where the projections are formed by silkscreen printing on the surface of the resin film, the manufacturing cost increases due to the necessity of additional equipment for printing, drying and others. It is also very difficult to control the position, size, shape and the like of the projections with the silkscreen printing.

Further, conventional regenerators formed by winding resin film have projections always regularly arranged on the surface of the resin film. This disadvantageously simplifies the flow of the working gas through the regenerator, making it difficult to obtain high heat exchange efficiency.

SUMMARY OF THE INVENTION

An object of the present invention is to provide a regenerator that is highly reliable, easy and inexpensive to manufacture, and exhibits high heat exchange efficiency, an apparatus for manufacturing the regenerator, and a Stirling refrigerator provided with the regenerator.

Another object of the present invention is to provide an apparatus for manufacturing a regenerator that ensures an increased degree of design freedom of projections to be formed on a resin film constituting the regenerator, and allows the projections to be formed with good reproducibility and with a high degree of accuracy.

A regenerator according to an aspect of the present invention is disposed on a flow passage for a working gas, and is formed by stacking a film-shaped resin member in a direction crossing a flow direction of the working gas. The resin member has a projection formed by subjecting its surface to plastic deformation. The projection provides a gap between layers of the stacked resin member.

As such, the projection is formed directly by causing the surface of the film-shaped resin member to undergo plastic deformation. Accordingly, the regenerator can be manufactured with ease and at low cost.

In the regenerator according to the aspect of the present invention, for example, the projection preferably has an opening on its tip.

As the opening is formed at the tip of the projection, the flow passage for the working gas flowing within the regenerator is disturbed, so that heat exchange efficiency can be improved.

In the regenerator according to the aspect of the present invention, for example, the projection is preferably formed by performing stamping on the surface of the resin member.

By conducting the stamping for forming the projection on the surface of the resin member, the surface of the resin member undergoes plastic deformation quite easily to form the projection. Further, forming the projection by stamping can increase the degree of design freedom of the projection and also allows formation of the projection with good reproducibility. Accordingly, it is possible to provide a regenerator having high heat exchange efficiency.

In the regenerator according to the aspect of the present invention, for example, the projection is preferably formed by irradiating the surface of the resin member with a laser beam.

The use of laser beam irradiation for forming the dimple on the surface of the resin member allows plastic deformation of the surface of the resin member with much ease to form the dimple. Further, the degree of design freedom of the dimple is increased, and the dimple can be formed with good reproducibility. Accordingly, it is possible to provide a regenerator having good heat exchange efficiency. Still further, compared to the dimple formed using the above-described stamping, reproducibility of the size and shape of the dimple to be formed further improves and occurrence of fine dust is prevented, so that a highly reliable regenerator can be provided.

In the regenerator according to the aspect of the present invention, for example, it is preferable that, on the surface of the resin member, the dimple in a prescribed region is adjusted to have a height different from that of the dimple in another region.

As the heights of the dimples formed in the resin member are adjusted in accordance with their positions, it is also possible to adjust the gaps between the layers of the stacked resin member to have different heights from each other. As a result, the gap between the layers of the stacked resin member can be determined in accordance with the heat flux flowing into and out of the relevant position. This can improve the heat exchange performance between the working gas and the resin member, and hence, the heat accumulation/radiation performance of the regenerator as a whole. Here, the way of selecting the regions to be defined as the prescribed region and the other region is not specifically restricted. They may be any regions arbitrarily selected on the surface of the resin member. The selected region may include a plurality of dimples, or may include a single dimple therein.

Further, the dimples being formed on the surface of the resin member may be separated into those for forming gaps between the layers of the stacked resin member and those for securing a greater heat transfer area. In this case, the dimples for forming gaps between the layers of the stacked resin member will need to be designed to be greater in height than the dimples for securing a greater heat transfer area.

In the regenerator according to the aspect of the present invention, for example, it is preferable that, on the surface of the resin member, the number of the dimples per unit area is adjusted to vary in different positions on the surface of the resin member.

As such, it is possible to adjust the number of the dimples to be formed per unit area on the surface of the resin member for each position of the resin member, and accordingly, the flow resistance and the heat transfer area of the stacked resin member can be determined in accordance with the heat flux flowing into or out of the relevant position. This improves the heat exchange performance between the working gas and the resin member, and accordingly, the heat accumulation and radiation performance of the regenerator as a whole can be improved.

A regenerator according to another aspect of the present invention is disposed on a flow passage for a working gas flowing between a compression space and an expansion space of a Stirling refrigerator, and is formed by stacking a film-shaped resin member in a direction crossing a flow direction of the working gas. The resin member has a plurality of dimples on its surface, and the dimples provide a gap between layers of the stacked resin member. On the surface of the resin member, the dimple in a prescribed region has a height differentiated from that of the dimple in another region.

Provision of the dimples of different heights enables determination of the height of each gap in accordance with the heat flux flowing into/out of the relevant position. As a result, the heat exchange performance between the working gas and the resin member improves, and accordingly, the heat accumulation/radiation performance of the regenerator as a whole improves. Here, the way of selecting the regions to be defined as the prescribed region and the other region is not specifically restricted. They may be any regions arbitrarily selected on the surface of the resin member. The selected region may include a plurality of dimples, or may include a single dimple therein. The present configuration is applicable, not only to the case where dimples are formed by plastic deformation, but also to the case where they are formed by bonding spacers or by printing.

A regenerator according to a further aspect of the present invention is disposed on a flow passage for a working gas flowing between a compression space and an expansion space of a Stirling refrigerator, and is formed by stacking a film-shaped resin member in a direction crossing a flow direction of the working gas. The resin member has a plurality of dimples on its surface, and the dimples provide a gap between layers of the stacked resin member. On the surface of the resin member, the number of the dimples per unit area is increased as the distance from the expansion space decreases, compared to the side of the compression space.

Generally, during the operation of the Stirling refrigerator, the working gas flowing in the regenerator is lower in temperature in the expansion space than in the compression space. This means that viscosity of the working gas is smaller in the expansion space than in the compression space. Thus, on the expansion space side where the working gas is easy to flow, the density of the dimples can be increased to earn a greater heat transfer area so as to improve the heat exchange performance between the working gas and the resin member. On the other hand, on the compression space side where the working gas is difficult to flow, the number of dimples can be decreased to reduce the flow resistance, to thereby realize smooth flow of the working gas. As a result, it is possible to improve the heat accumulation/radiation performance of the regenerator as a whole. It is noted that the present configuration is applicable, not only to the case where the dimples are formed by plastic deformation, but also to the case where they are formed by bonding spacers or by printing.

A Stirling refrigerator according to the present invention is provided with any of the above-described regenerators.

The Stirling refrigerator provided with any of the regenerators described above exhibits improved heat exchange efficiency as the refrigerator as a whole, so that it is possible to provide a Stirling refrigerator having good refrigeration performance. It is also possible to provide a highly reliable Stirling refrigerator with ease and at low cost.

A manufacturing method of a regenerator according to the present invention is a method of manufacturing a regenerator that is disposed on a flow passage for a working gas and is formed by stacking a film-shaped resin member in a direction crossing a flow direction of the working gas. The method includes a dimple formation step and a stacking step. In the dimple formation step, the surface of the resin member is subjected to plastic deformation to form a dimple for providing a gap between layers of the resin member when stacked. In the stacking step, the resin member having the dimple formed thereon is stacked.

As such, the dimple is formed on the surface of the resin member by causing the resin member itself to undergo plastic deformation. This makes it possible to manufacture the regenerator very easily and inexpensively.

In the manufacturing method of a regenerator according to the present invention, for example, the dimple formation step preferably includes the stamping step of performing stamping on the surface of the resin member using a stamping die to form the dimple.

When the dimple is formed by subjecting the surface of the resin member to plastic deformation in the stamping process using the stamping die, it can be formed very easily and inexpensively. Further, forming the dimple by stamping ensures that the dimple can be formed with good reproducibility.

In the manufacturing method of a regenerator according to the present invention, for example, it is preferable that the dimple formation step further includes the positioning step of determining the positions of the stamping die and the resin member by moving them relative to each other in a direction approximately parallel to the surface of the resin member. Further, it is preferable that the positioning step and the stamping step described above are conducted alternately to allow the dimple to be formed at a desired position on the surface of the resin member.

When the positioning step of moving the stamping die and the resin member relative to each other is further provided, it is possible to form the dimple easily and quickly at a desired position by alternately repeating the positioning and the stamping processes.

In the manufacturing method of a regenerator according to the present invention, for example, the timing of stamping with the stamping die, the pressure applied for the stamping, and the speed of relative movement of the stamping die and the resin member may be controlled to enable adjustment of the position, size and shape of the dimple to be formed on the surface of the resin member.

Such control of the timing of the stamping with the stamping die, the pressure applied for the stamping, and the speed of relative movement of the stamping die and the resin member realizes easy adjustment of the position, size and shape of the dimple formed on the surface of the resin member. For example, the dimples can be arranged at random or in a matrix (in rows and columns) on the surface of the film-shaped resin member, ensuring the very high degree of design freedom. Accordingly, it is possible to form dimples as designed with good reproducibility, and thus to manufacture a regenerator of high performance at low cost.

The manufacturing method of a regenerator according to the present invention preferably includes, for example, the laser beam irradiation step of irradiating the surface of the resin member with a laser beam to form the dimple.

When the dimple is formed by laser beam irradiation making the surface of the resin member undergo plastic deformation, the regenerator can be manufactured with ease and at low cost. Further, with the laser process, the dimple can be formed with good reproducibility.

In the manufacturing method of a regenerator according to the present invention, for example, it is preferable that the laser beam irradiation step further includes the positioning step of determining the positions of a light source of the laser beam and the resin member by moving them relative to each other in a direction approximately parallel to the surface of the resin member. Further, it is preferable that the positioning step and the laser beam irradiation step described above are performed alternately to enable formation of the dimple in a desired position on the surface of the resin member.

With provision of the positioning step of relatively moving the light source of the laser beam and the resin member, the dimples can be formed in desired positions easily and quickly by alternately repeating the positioning and laser beam irradiation processes.

In the manufacturing method of a regenerator according to the present invention, for example, it is preferable that the laser beam irradiation step further includes the step of scanning and irradiating with the laser beam in pulses.

Such scanning and irradiation of the laser beam in pulses makes it possible to easily and rapidly form a plurality of dimples on the surface of the resin member.

In the manufacturing method of a regenerator according to the present invention, for example, a spot diameter, irradiation power and irradiation time of the laser beam for irradiating the resin member may be controlled to adjust a position, size and shape of the dimple formed on the surface of the resin member.

With the spot diameter, power and time of irradiation of the laser beam being controlled, a variety of shapes of dimples can be formed on the surface of the resin member with good reproducibility. For example, raised lines may be formed in parallel along the flow direction of the working gas, or the dimples as described above may be arranged at random or in a matrix, guaranteeing a very high degree of design freedom. Accordingly, it is possible to form the dimples as designed with good reproducibility, and thus, to manufacture a regenerator of high performance at low cost.

In the manufacturing method of a regenerator according to the present invention, for example, the stacking step preferably includes the step of winding up the resin member having the dimples formed thereon.

When the stacked structure is formed by winding up the resin member, it is possible to manufacture the regenerator with ease and at low cost, compared to the case of manufacturing the regenerator by cutting or bending the resin member.

A manufacturing apparatus of a regenerator according to the present invention is for forming a dimple on a surface of a film-shaped resin member, and includes sending means and dimple formation means. The sending means is for sending the film-shaped resin member in one direction, and the dimple formation means is for making the surface of the film-shaped resin member undergo plastic deformation to form the dimple.

As such, the sending means is used to send the film-shaped resin member, and the dimple formation means is used to form the dimple on the surface of the resin member by making the resin member itself undergo the plastic deformation. Accordingly, it is possible to form the dimples continuously on the surface of the resin member, and thus, to manufacture the regenerator easily, quickly and inexpensively.

The manufacturing apparatus of a regenerator according to the present invention preferably includes, for example, height adjustment means having a pair of pinching members spaced apart from each other by a predetermined distance and arranged to face each other in a direction crossing the surface of the film-shaped resin member on a downstream side of the dimple formation means, for adjusting a height of the dimple formed by the dimple formation means by letting the film-shaped resin member pass through a gap between the pinching members.

With the height adjustment means for adjusting the height of the dimple being arranged on the downstream side of the dimple formation means, the height of the dimple formed on the surface of the resin member is easily adjusted to a desired height. In this configuration, the height adjustment means is configured simply with a pair of pinching members, which will not increase the manufacturing cost. The quick adjustment of the height of the dimple will not impair the productivity, either.

In the manufacturing apparatus of a regenerator according to the present invention, for example, it is preferable that a gap between the pair of pinching members is adjustable.

When the gap between the pair of pinching members is configured to be adjustable, it is readily possible to address the case where a height of the dimple to be adjusted using the pinching members is changed due to design change or the like.

In the manufacturing apparatus of a regenerator according to the present invention, for example, the dimple formation means is preferably comprised of a stamping die, and a stage located to face the stamping die via the film-shaped resin member being sent in the one direction.

As such, it is possible to use a stamping machine having a stamping die and a stage as the dimple formation means for forming the dimple by causing the film-shaped resin member itself to undergo plastic deformation. The use of the stamping machine as the dimple formation means allows the dimples to be formed continuously on the surface of the resin member with ease, and thus, it is possible to manufacture the regenerator at low cost.

In the manufacturing apparatus of a regenerator according to the present invention, for example, the stage preferably has a concave portion at a position corresponding to the stamping die.

Provision of the concave portion in the stage at a position corresponding to the stamping die guarantees a space where the dimple and the stamping die can escape at the time of stamping, thereby enabling continuous formation of the dimples with the stamping process.

In the manufacturing apparatus of a regenerator according to the present invention, for example, the concave portion preferably extends toward the downstream side of the moved direction of the film-shaped resin film that is sent out in the one direction, to reach an end of the stage.

When the dimples are to be formed continuously on the surface of the resin member using the stamping machine while the film-shaped resin member is being sent out by the sending means, there is a concern that the dimple formed may come into contact with the stage. Thus, with this configuration, the concave portion provided in the stage is made to extend toward the downstream side of the movement direction of the resin member to reach the end of the stage. This can prevent contact between the dimple and the stage, and thus, the resin member is prevented from being stuck with the stage, and deformation of the dimple is also prevented.

In the manufacturing apparatus of a regenerator according to the present invention, for example, the stamping die preferably has a plurality of needles each having a tip in an approximately conical shape, to allow formation of a plurality of dimples on the surface of the film-shaped resin member with one time of stamping.

When the stamping die has a plurality of needles, one time stamping can form a plurality of dimples on the surface of the resin member, so that it is possible to manufacture a regenerator quickly and easily.

In the manufacturing apparatus of a regenerator according to the present invention, for example, the dimple formation means is preferably comprised of laser beam irradiation means for irradiation with a laser beam.

As such, the laser beam irradiation means for irradiation with a laser beam can be used as the dimple formation means for forming a dimple by making the film-shaped resin member itself undergo plastic deformation. When the laser beam irradiation means is used as the dimple formation means, it is possible to form the dimples continuously and easily on the surface of the resin member, so that the regenerator can be provided at low cost.

In the manufacturing apparatus of a regenerator according to the present invention, for example, the laser beam irradiation means is preferably configured to perform scanning and irradiation with the laser beam in pulses.

By scanning and irradiating the surface of the resin member with the laser beam in pulses by the laser beam irradiation means, a plurality of dimples can be formed continuously, easily and rapidly.

DETAILED DESCRIPTION OF THE INVENTION

Hereinafter, embodiments of the present invention will be described with reference to the drawings. In the following embodiments, a regenerator mounted to a Stirling refrigerator will be explained by way of example.

First Embodiment

Figure 1:
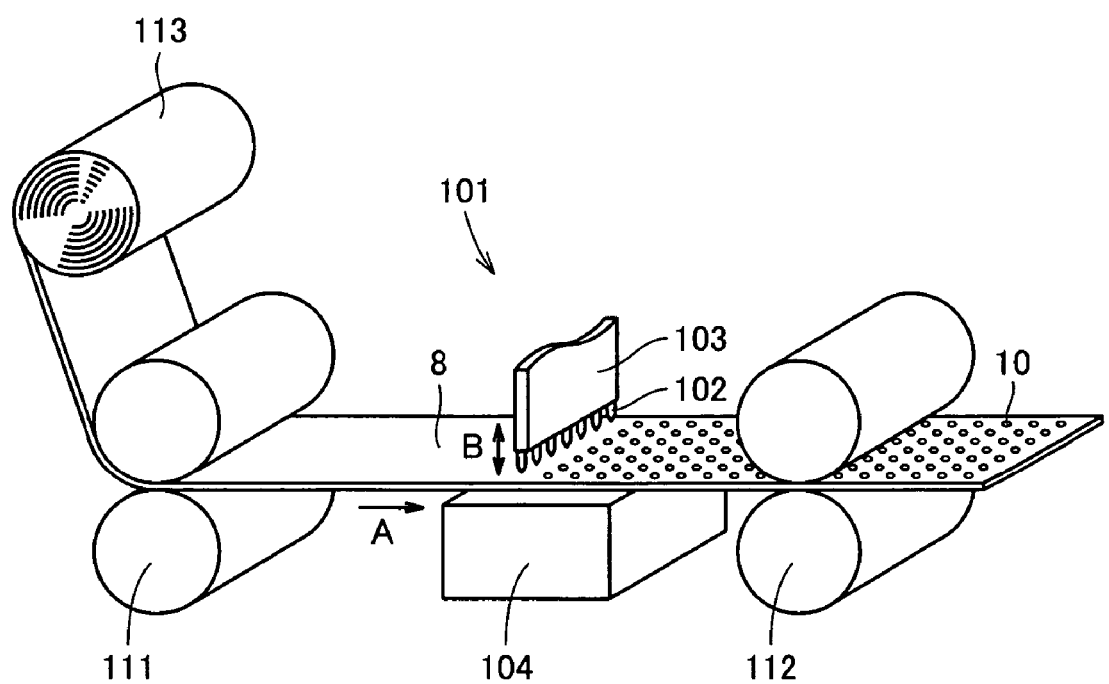
FIG. 1 is a schematic diagram illustrating a manufacturing method and apparatus of a regenerator according to a first embodiment of the present invention.
Figure 2:
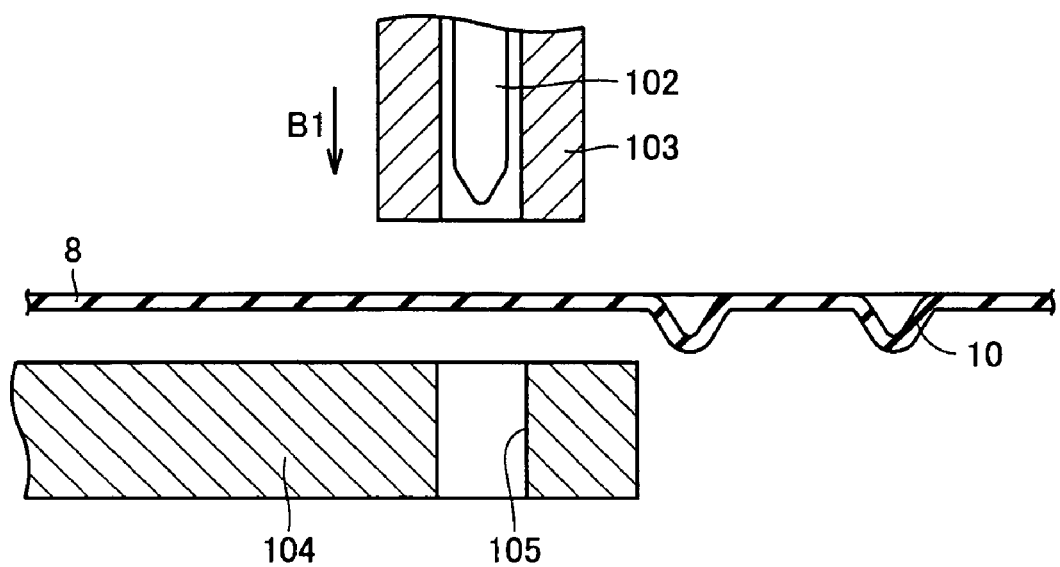
FIG. 2 is a cross sectional view of a stamping machine showing a first stage of a stamping step, illustrating a dimple formation step in the first embodiment of the present invention.
Figure 3:
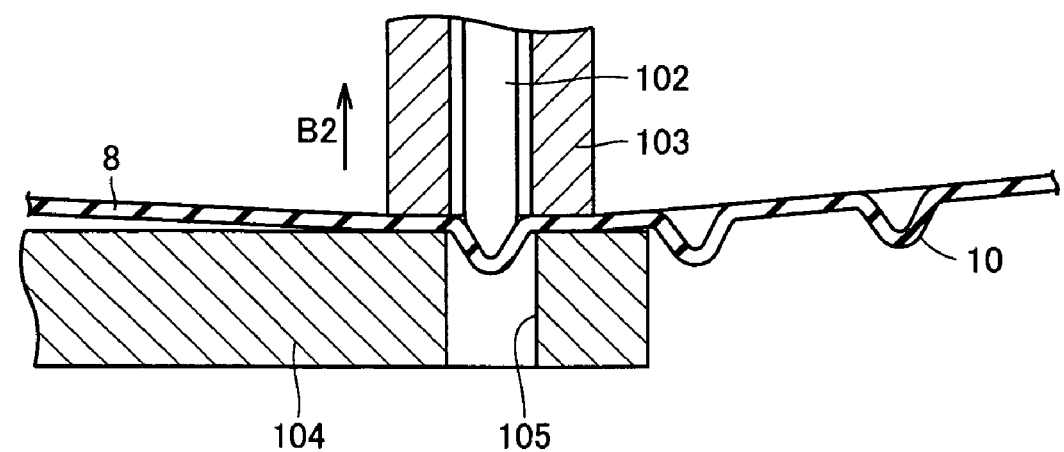
FIG. 3 is a cross sectional view of the stamping machine showing a second stage of the stamping step, illustrating the dimple formation step in the first embodiment of the present invention.
Figure 4:
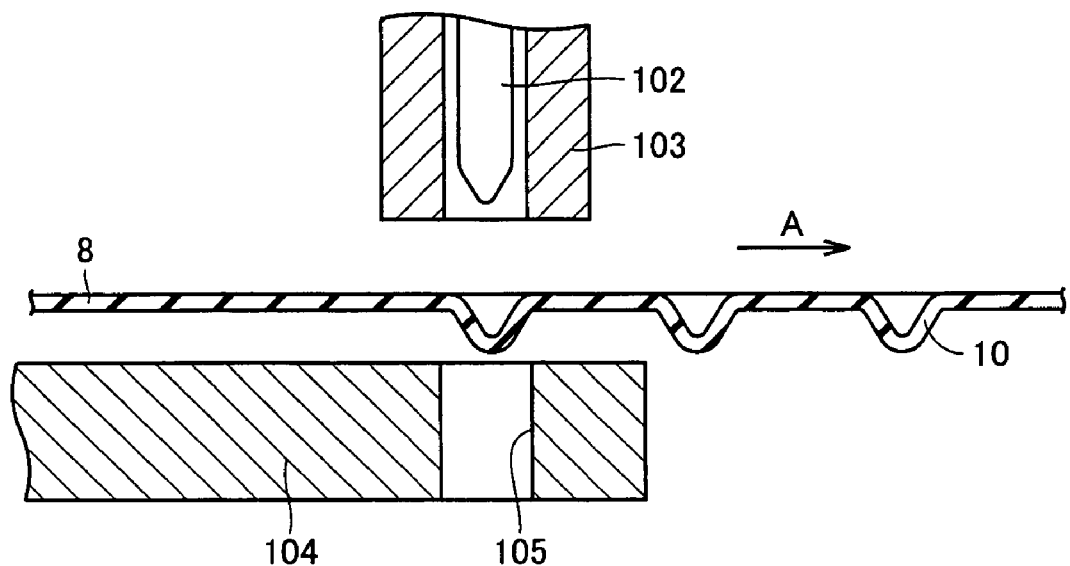
FIG. 4 is a cross sectional view of the stamping machine showing a third stage of the stamping step, illustrating the dimple formation step in the first embodiment of the present invention.
Figure 12:
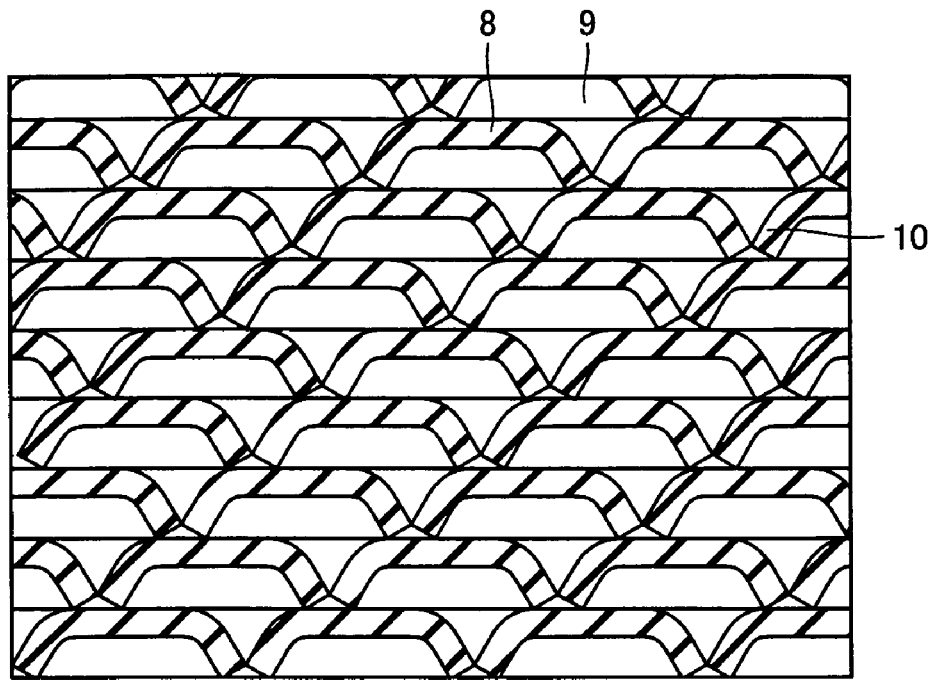
FIG. 12 is an enlarged cross sectional view of the regenerator according to the first embodiment of the present invention.

FIG. 1 is a schematic diagram illustrating a manufacturing method and apparatus of a regenerator according to a first embodiment of the present invention. FIGS. 2-4 are cross sectional views of a stamping machine to illustrate a dimple formation step of the present embodiment in greater detail. FIGS. 5-9 are top plan views of the resin film to show layout patterns of the dimples. FIGS. 10A and 10B are enlarged cross sectional views of the resin film to show the shapes of the dimples. Further, FIG. 111 is a schematic diagram showing a stacking step of the present embodiment, and FIG. 12 is an enlarged cross sectional view of the regenerator according to the present embodiment.

(Manufacturing Apparatus of Regenerator)

Firstly, a manufacturing apparatus of a regenerator according to the present embodiment is described with reference to FIG. 1. The manufacturing process of the regenerator formed by winding a film-shaped resin member primarily includes the dimple formation step of forming a dimple on a surface of the resin film, and the stacking step of stacking the resin film having the dimple formed thereon. The manufacturing apparatus of the regenerator shown in FIG. 1 is used for the dimple formation step of forming a dimple on the surface of the resin film.

As shown in FIG. 1, the manufacturing apparatus of the regenerator according to the present embodiment includes, among others, a film feeder 113 as the sending means for sending out the resin film, and a stamping machine 101 as the dimple formation means. Stamping machine 101 is located on the downstream side of film feeder 113, and includes a stamping die 102, a presser 103, and a stage 104. Stamping die 102 and stage 104 are arranged spaced apart from each other to sandwich therebetween the resin film 8 that is sent out by film feeder 113 in one direction (shown by an arrow A in the figure). Stamping die 102 and presser 103 are movable in the vertical direction (shown by an arrow B in the figure). Stage 104 has a concave portion 105, at a position corresponding to stamping die 102, to be a clearance for stamping die 102 at the time of stamping (see FIGS. 2-4).

(Dimple Formation Step)

A method of forming a dimple on a surface of a resin film using the manufacturing apparatus of a regenerator configured as described above is now explained. Referring to FIG. 1, resin film 8, sent out in one direction by film feeder 113, passes a driving roller 111 and reaches stamping machine 101. Stamping machine 101 performs stamping on resin film 8 at predetermined timings, to continuously form dimples 10 on the surface of resin film 8.

Specifically, firstly, film feeder 113 sends out resin film 8 to effect positioning such that an intended region for forming dimple in resin film 8 is positioned immediately beneath the stamping die 102 of stamping machine 101 (see FIG. 2). This corresponds to the positioning step of determining relative positions of stamping die 102 and resin film 8 for forming the dimple. Next, presser 103 moves downward (in a direction shown by an arrow B1 in the figure). Presser 103 presses resin film 8 to contact stage 104, and stamping die 102 then moves downward to press downward the intended region for forming dimple of resin film 8, as shown in FIG. 3. The surface of resin film 8 undergoes plastic deformation, and thus, a dimple 10 pointed downward is formed. This corresponds to a stamping step as the dimple formation step. Thereafter, stamping die 102 and presser 103 move upward (in a direction shown by an arrow B2 in the figure) to return to a reference position, and resin film 8 is sent out again in the arrow A direction, as shown in FIG. 4.

The positioning step and the stamping step as described above are repeated to continuously form dimples 10 on the surface of resin film 8. In the present embodiment, resin film 8 is configured to move above stage 104. Thus, stage 104 and resin film 8 are spaced apart from each other by a distance greater than a height of dimple 10 to be formed, so that dimple 10 formed will not come into contact with concave portion 105 of stage 104.

(Formation Position of Dimple)

The position of the dimple formed on the surface of the resin film is now described. Using the manufacturing method and apparatus of a regenerator according to the present embodiment, the dimples can be formed on the surface of the resin film in a variety of layout patterns. Specifically, the timing of stamping, and the movement speed of the stamping die and the resin film relative to each other can be controlled to realize various patterns. Further, when a plurality of needles are provided to the stamping die for forming a plurality of dimples on the resin film at one time, the dimples can be formed in an increased number of variations of patterns. Hereinafter, some of the layout patterns of the dimples will be given as examples.

(Layout Pattern 1)

Figure 5:
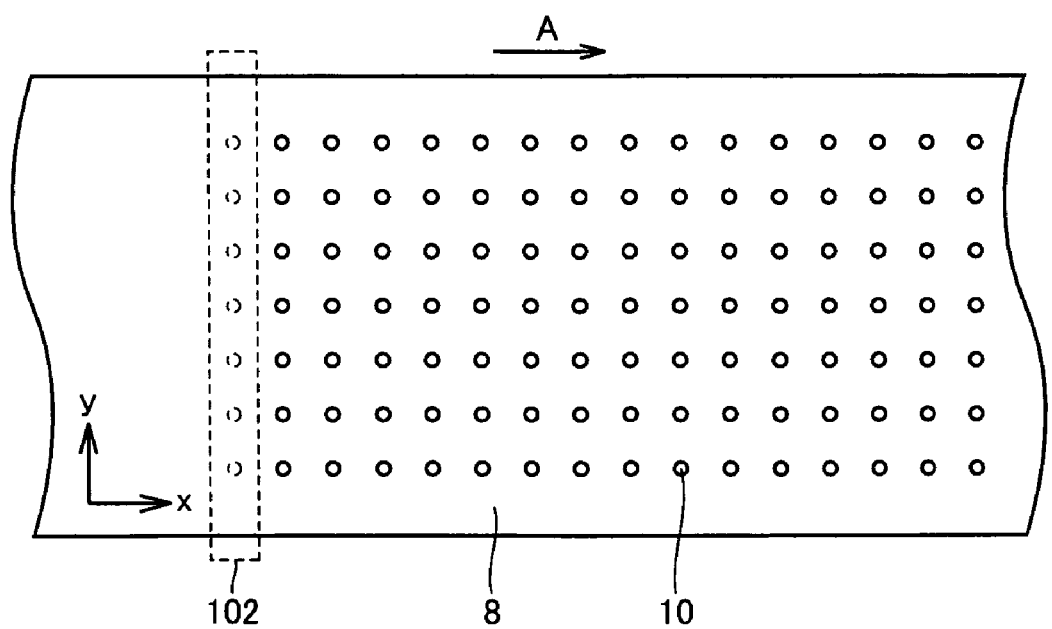
FIG. 5 is a top plan view of a resin film showing a layout pattern 1 of dimples that are formed using the manufacturing method and apparatus of a regenerator according to the first embodiment of the present invention.

FIG. 5 is a top plan view of a resin film showing a layout pattern 1. The layout pattern of the dimples shown in FIG. 5 has dimples formed in a matrix on the surface of resin film 8. That is, referring to FIG. 5, on the surface of resin film 8, dimples 10 are arranged in rows and columns in the x and y directions. The dimples arranged in the x direction in the figure are equally spaced from each other. The dimples in the y direction are also arranged at regular intervals.

To realize the relevant layout of the dimples, for example, stamping die 102 having a plurality of needles arranged at regular intervals in the y direction as shown in FIG. 5 is used. Resin film 8 is moved at a constant speed in the A direction (x direction) with respect to stamping die 102, and stamping die 102 is used to perform stamping at constant timings. As such, the layout pattern having the dimples arranged in a matrix as shown in FIG. 5 is realized.

(Layout Pattern 2)

Figure 6:
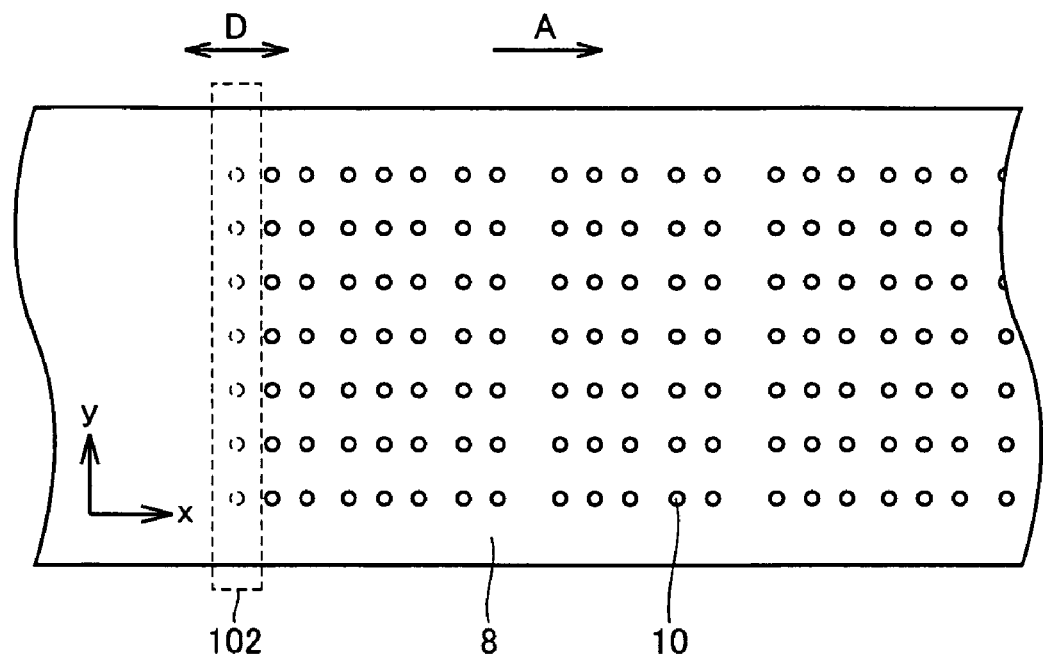
FIG. 6 is a top plan view of a resin film showing a layout pattern 2 of dimples that are formed using the manufacturing method and apparatus of a regenerator according to the first embodiment of the present invention.

FIG. 6 is a top play view of a resin film showing a layout pattern 2. The layout pattern of the dimples shown in FIG. 6 has dimples 10 formed in rows and columns on the surface of resin film 8, as in the above-described layout pattern 1. The present layout pattern however differs from layout pattern 1 in that the intervals of the dimples in the x direction are at random. That is, the distance between the neighboring dimples in the x direction varies, instead of being constant.

As a way of forming the dimples in the present layout pattern, stamping die 102 having a plurality of needles equally spaced apart from each other in the y direction as shown in FIG. 6 may be used. Resin film 8 is moved at an irregular speed in the A direction (x direction) with respect to stamping die 102, and stamping die 102 is used to perform stamping at constant timings. Alternatively, resin film 8 may be moved at a constant speed in the A direction (x direction) with respect to stamping die 102, while stamping is performed with stamping die 102 being displaced irregularly in the direction shown by an arrow D in FIG. 6. Still alternatively, resin film 8 may be moved at a constant speed in the A direction (x direction) with respect to stamping die 102, and the stamping timings of stamping die 102 may be varied irregularly.

(Layout Pattern 3)

Figure 7:
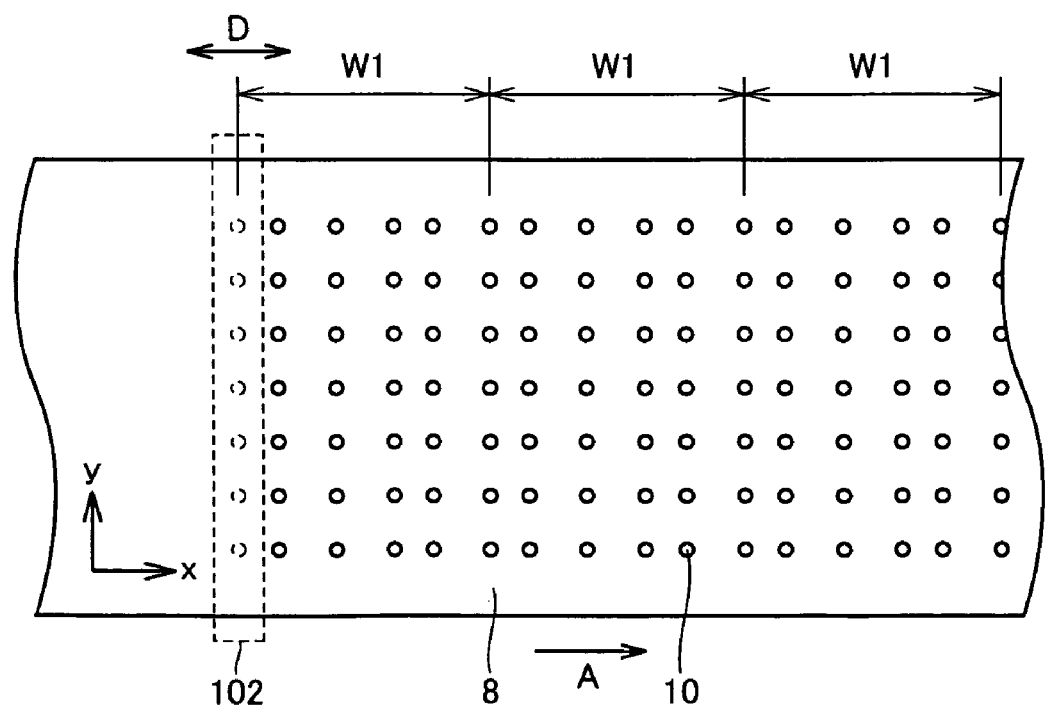
FIG. 7 is a top plan view of a resin film showing a layout pattern 3 of dimples that are formed using the manufacturing method and apparatus of a regenerator according to the first embodiment of the present invention.

FIG. 7 is a top plan view of a resin film showing a layout pattern 3. The layout pattern of the dimples shown in FIG. 7 has dimples 10 arranged in rows and columns on the surface of resin film 8 as in the above-described layout patterns 1 and 2. The present layout pattern however differs from layout patterns 1 and 2 in that identical patterns are formed repeatedly at a width of W1 in the x direction.

To form the dimples in the present layout pattern, stamping die 102 having a plurality of needles arranged at regular intervals in the y direction as shown in FIG. 7 may be used. Resin film 8 may be moved in the A direction (x direction) with respect to stamping die 102 at a speed that changes with a regular period, and stamping die 102 may be used to perform stamping at regular timings. Alternatively, resin film 8 may be moved at a constant speed in the A direction (x direction) with respect to stamping die 102, and stamping die 102 may be used to perform stamping with resin film 8 being displaced in the arrow D direction in FIG. 7 with a regular period. Further, resin film 8 may be moved at a constant speed in the A direction (x direction) with respect to stamping die 102, and the stamping timings of stamping die 102 may be varied with a regular period.

(Layout Pattern 4)

Figure 8:
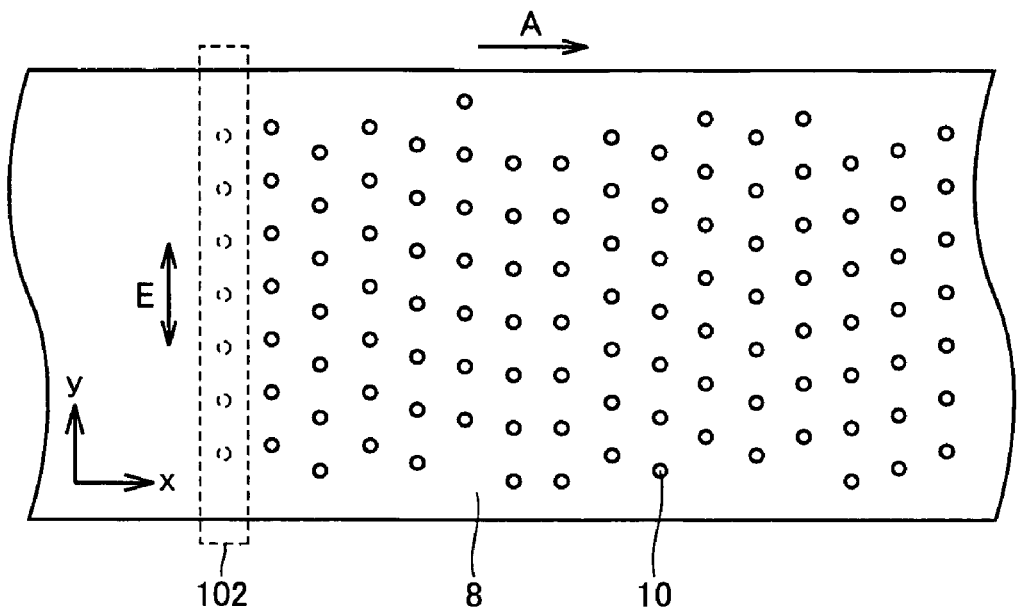
FIG. 8 is a top plan view of a resin film showing a layout pattern 4 of dimples that are formed using the manufacturing method and apparatus of a regenerator according to the first embodiment of the present invention.

FIG. 8 is a top plan view of a resin film showing a layout pattern 4. The layout pattern of the dimples shown in FIG. 8 has dimples arranged at regular intervals in the y direction but arranged at random in the x direction.

To form the dimples in the present layout pattern, stamping die 102 having a plurality of needles arranged at regular intervals in the y direction as shown in FIG. 8 may be employed. Resin film 8 may be moved at a constant speed in the A direction (x direction) with respect to stamping die 102, and stamping die 102 may be pressed at constant timings while being displaced at random in the direction shown by an arrow E in FIG. 8.

(Layout Pattern 5)

Figure 9:
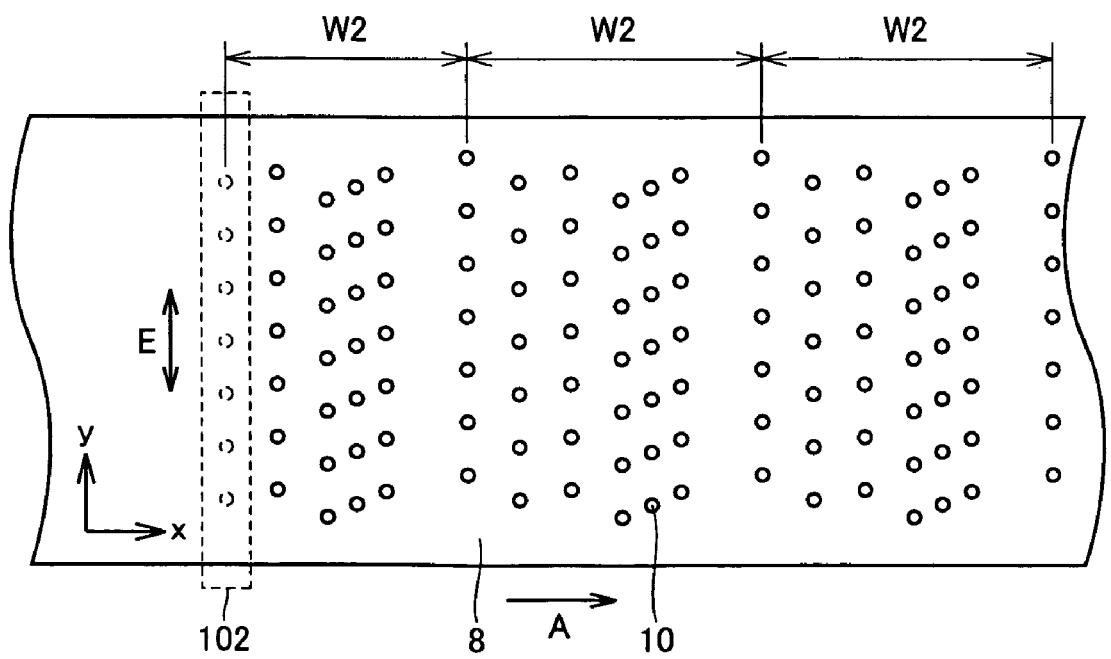
FIG. 9 is a top plan view of a resin film showing a layout pattern 5 of dimples that are formed using the manufacturing method and apparatus of a regenerator according to the first embodiment of the present invention.
Figure 10A:
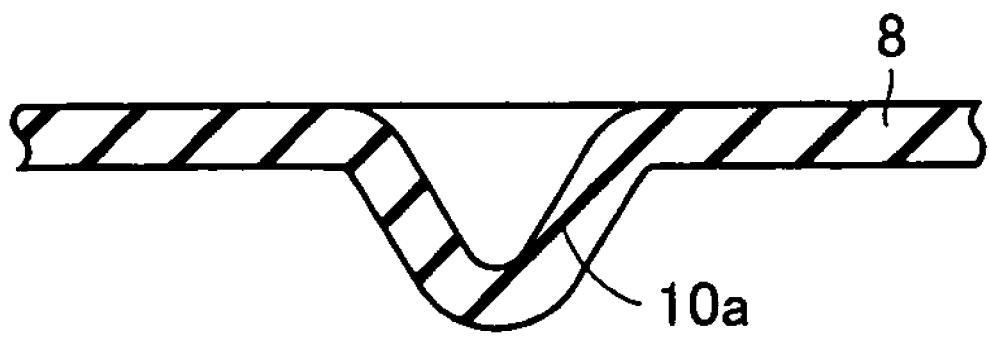
FIG. 10A is an enlarged cross sectional view of a resin film showing a shape of the dimple that is formed using the manufacturing method and apparatus of a regenerator according to the first embodiment of the present invention.
Figure 10B:
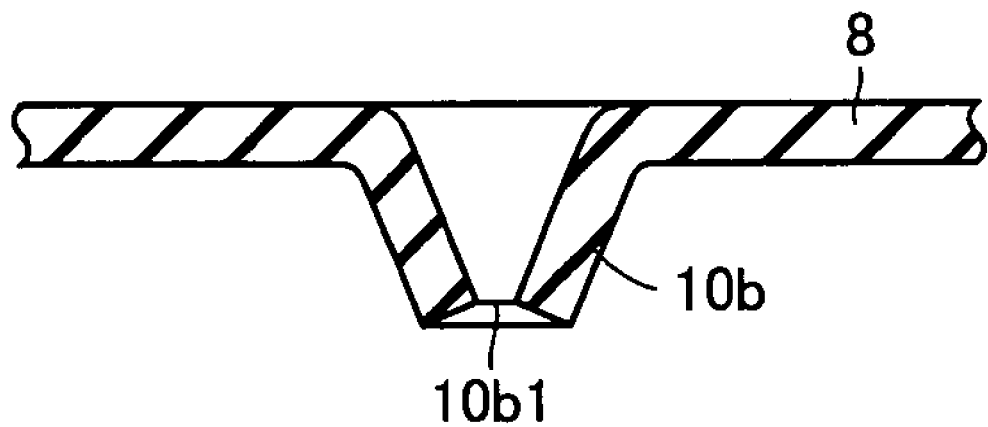
FIG. 10B is an enlarged cross sectional view of a resin film showing another shape of the dimple that is formed using the manufacturing method and apparatus of a regenerator according to the first embodiment of the present invention.

FIG. 9 is a top plan view of a resin film showing a layout pattern 5. The layout pattern of dimples shown in FIG. 9 is a combination of the above-described layout patterns 3 and 4. That is, the dimples are formed at regular intervals in the y direction but at random in the x direction, with identical patterns repeated at a width of W2.

To form the dimples in the present layout pattern, stamping die 102 having a plurality of needles arranged at regular intervals in the y direction as shown in FIG. 9 may be used. With stamping die 102 being displaced in the E direction, resin film 8 may be moved at a speed varying with a regular period in the A direction (x direction) with respect to stamping die 102, and stamping die 102 may be pressed at constant timings.

The five layout patterns described above are realized using the stamping die of the same shape. That is, even if the same stamping die is employed, the stamping timings and the relative movement speed of the stamping die and the resin film may be controlled to realize a variety of layout patterns. Compared to layout pattern 1 having the dimples arranged in a matrix, layout patterns 2-5 provide more complicated flow of the working gas. This improves the heat exchange efficiency in the regenerator, ensuring high performance of the regenerator.

(Shape of Dimple)

The shape of the dimple is now described. Primarily two shapes are conceivable for the dimples to be formed by stamping. One is a dimple 10a having a shape as shown in FIG. 10A, and the other is a dimple 10b having a shape as shown in FIG. 10B. Each of dimples 10a and 10b may have a size that can be adjusted by the pressure being applied when stamping with the stamping die.

FIG. 10A shows the shape of the dimple that is formed when a stamping die employed is in a conical shape with a curved tip. As shown in the figure, the dimple 10a formed with the stamping die of this shape is in an approximately V shape protruding downward from the main surface of resin film 8.

FIG. 10B shows the shape of the dimple that is formed when a stamping die employed is in a conical shape with a sharp pointed tip. As shown in the figure, the dimple 10b formed with the stamping die of this shape is an annular dimple having an opening 10b1 at its tip.

Of the two shapes as described above primarily conceivable for dimples 10, the annular dimple 10b having opening 10b1 at its tip as shown in FIG. 10B is more preferable than dimple 10a of an approximately V shape as shown in FIG. 10A, since when resin film 8 is stacked, the working gas flowing through a gap between the layers of stacked resin film 8 can pass through the opening 10b1 of dimple 10b toward another gap. With a complicated flow passage configurable for the working gas, the flow of the working gas is disturbed, and accordingly, a regenerator much improved in heat conductivity can be manufactured.

(Stacking Step and Mounting Step)

Figure 11:
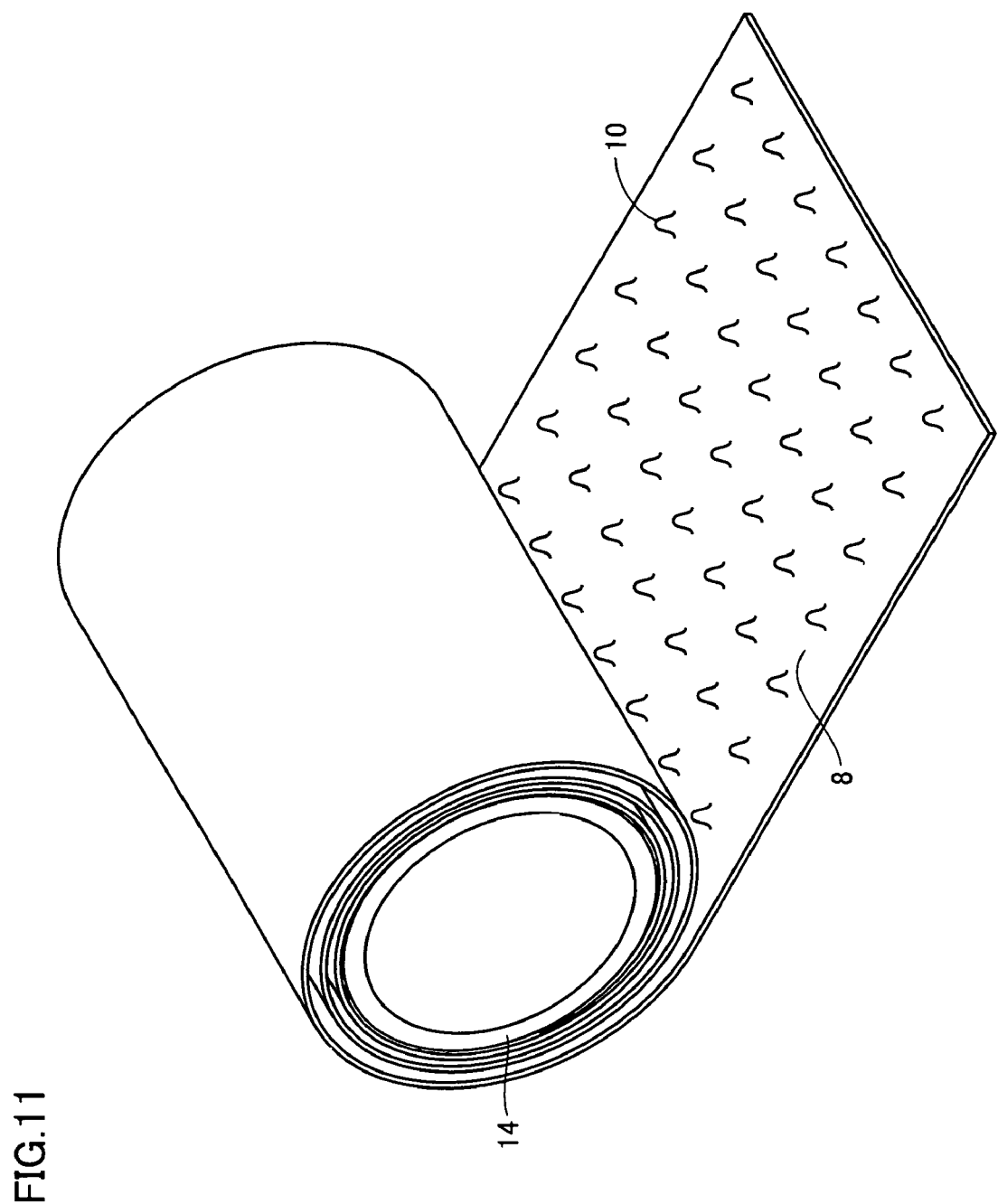
FIG. 11 is a schematic diagram showing a stacking step in the first embodiment of the present invention.

The stacking step of stacking the resin film is now explained. As shown in FIG. 11, resin film 8 having dimples 10 formed on its surface is cut into a prescribed length, and then stacked while being wound around a bobbin 14 of a cylindrical shape. At this time, dimples 10 preformed on the surface of resin film 8 constitute gap 9 between layers of stacked resin film 8, so that a flow passage for the working gas is formed in the axis direction of resin film 8 formed by winding (see FIG. 12). As such, the regenerator is formed by stacking the resin film in a direction crossing the flow direction of the working gas.

Bobbin 14 and resin film 8 wound around it constitute the regenerator 15 of the Stirling refrigerator, which is mounted to a prescribed position in the Stirling refrigerator in a manner similar to that explained above in conjunction with the conventional example.

(Effects)

When the regenerator is produced using the manufacturing method and apparatus of a regenerator as described above, dimples can be formed continuously on the surface of the resin film with ease and at low cost. As a result, manufacture of a Stirling refrigerator is simplified to a great extent. Further, as the dimples are formed by plastic deformation of the resin film in itself, the dimples can be formed with good reproducibility and with ease, compared to the conventional cases where the dimples are formed by bonding spacers or by performing silkscreen printing. Accordingly, a regenerator excellent in heat exchange efficiency as well as a Stirling refrigerator of high efficiency can be provided inexpensively.

Second Embodiment

Figure 13:
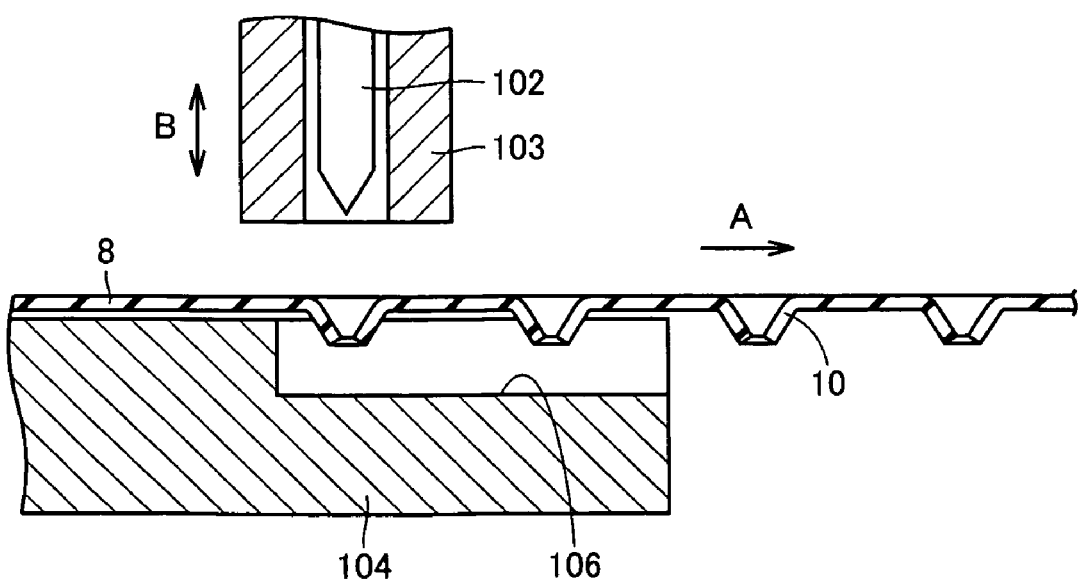
FIG. 13 is a cross sectional view of a stamping machine according to a second embodiment of the present invention.
Figure 14:
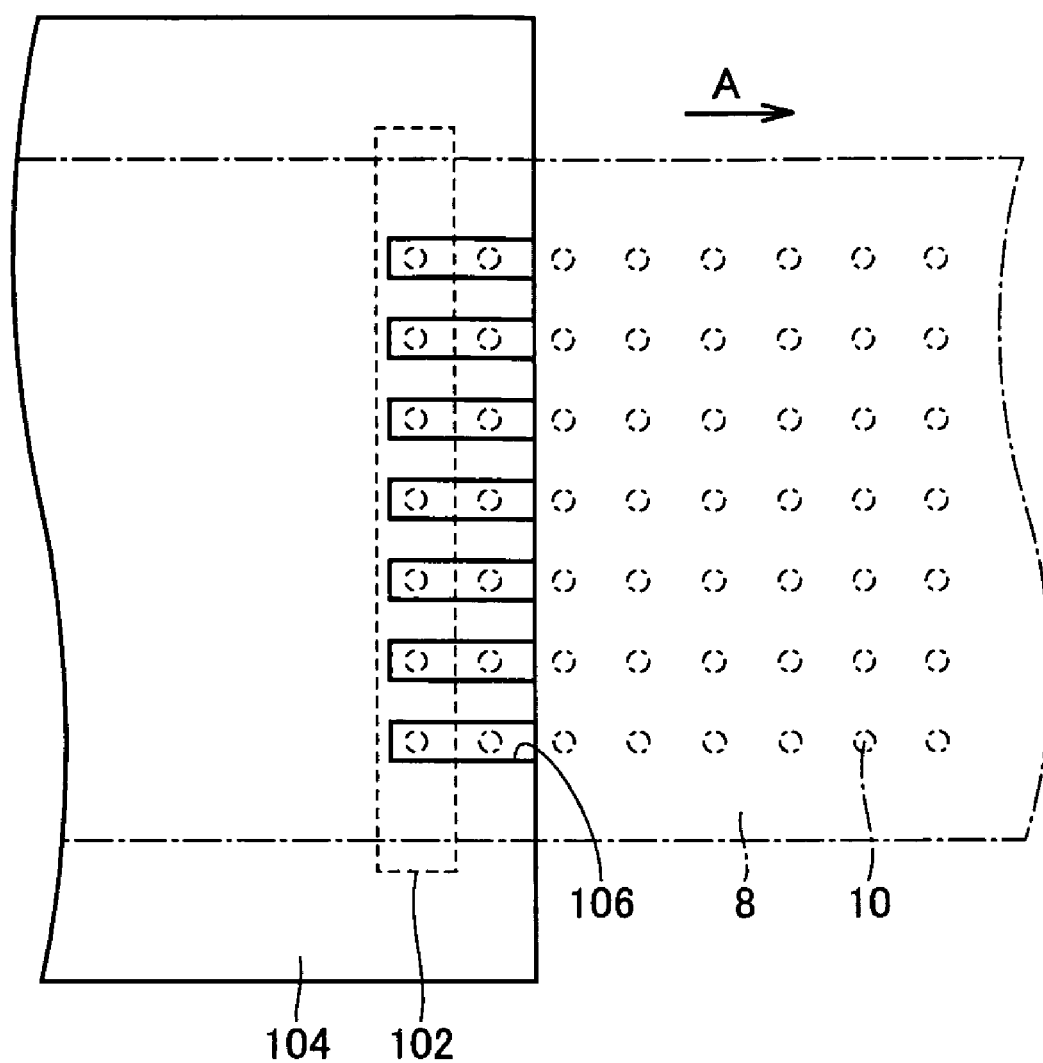
FIG. 14 is a top plan view illustrating a shape of the stamping machine according to the second embodiment of the present invention.

FIG. 13 is a cross sectional view of a stamping machine in a second embodiment of the present invention. FIG. 14 is a top plan view illustrating a shape of the stamping machine of the present embodiment.

(Manufacturing Apparatus of Regenerator)

A manufacturing apparatus of a regenerator according to the present embodiment is comprised of a film feeder as the sending means and a stamping machine as the dimple formation means, as is the first embodiment described above. Referring to FIGS. 13 and 14, a stamping machine 101 includes a stamping die 102, a presser 103 and a stage 104, as in the first embodiment described above. Stamping die 102 and stage 104 are arranged in a vertical direction sandwiching therebetween a resin film 8 that is sent out by the film feeder in one direction (shown by an arrow A in the figure). Stamping die 102 and presser 103 are movable in the vertical direction (shown by an arrow B in the figure). Stage 104 has a concave portion 106 extending from a position corresponding to stamping die 102 toward the downstream side of the moving direction (shown by the arrow A in the figure) of resin film 8. This concave portion 106 reaches the end of stage 104. Concave portion 106 serves as a clearance for stamping die 102 at the time of stamping.

(Dimple Formation Step)

As in the first embodiment described above, the manufacturing apparatus of a regenerator of the present embodiment performs stamping on the resin film moving on stage 104 of stamping machine 101 at predetermined timings, so that dimples 10 are formed continuously on the surface of resin film 8. FIG. 13 shows the case where stamping die 102 having a sharp pointed tip is used to form annular dimple 10b as shown in FIG. 10B on the surface of resin film 8.

(Effects)

In the present embodiment, concave portion 106 reaches the end of stage 104 on the downstream side of the moving direction of resin film 8, which prevents dimple 10 formed on the surface of resin film 8 from coming into contact with stage 104. Further, although the distance between stage 104 and resin film 8 should be greater than the height of dimple 10 being formed in the above-described embodiment, in the present embodiment, resin film 8 may be arranged immediately above stage 104, since concave portion 106 extends to the end of stage 104. As such, it is possible to form dimples 10 with a higher degree of accuracy than in the first embodiment.

Third Embodiment

Figure 15:
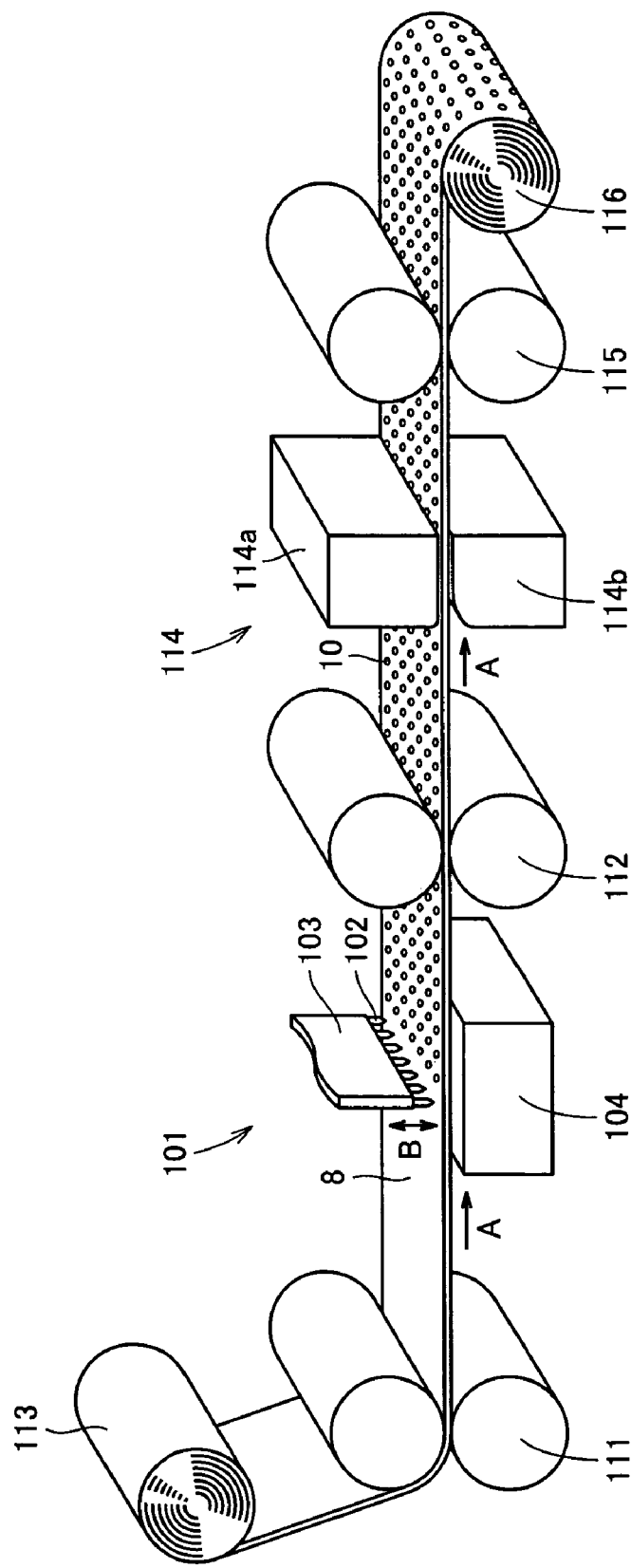
FIG. 15 is a schematic diagram illustrating a manufacturing method and apparatus of a regenerator according to a third embodiment of the present invention.
Figure 16:
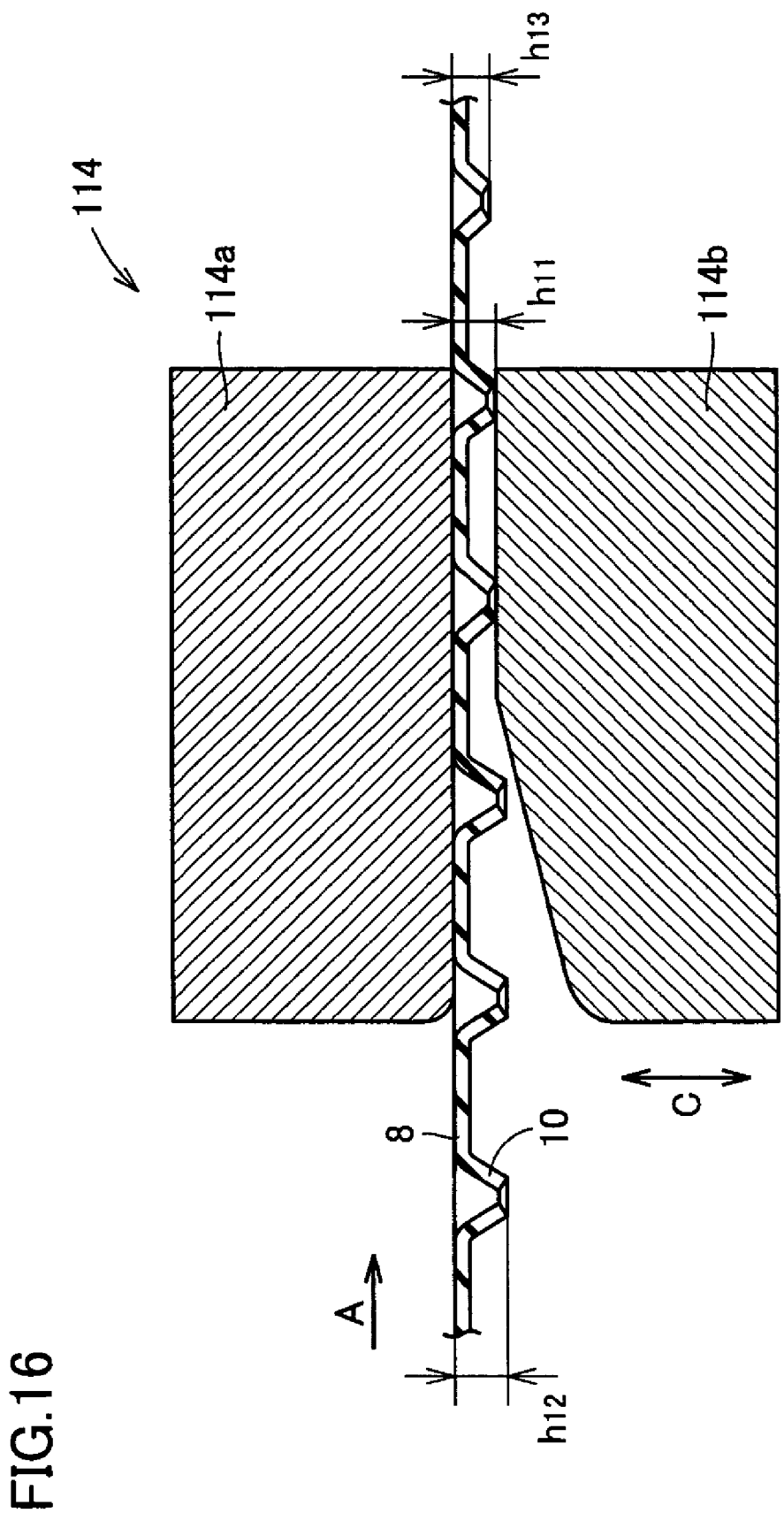
FIG. 16 is a cross sectional view of height adjustment means in the third embodiment of the present invention.

FIG. 15 is a schematic diagram illustrating a manufacturing method and apparatus of a regenerator according to a third embodiment of the present invention. FIG. 16 is a cross sectional view of height adjustment means for adjusting a height of the dimple formed on the surface of the resin film.

(Manufacturing Apparatus of Regenerator)

The manufacturing apparatus of a regenerator according to the present embodiment includes a film feeder 113 as the sending means, and a stamping machine 101 as the dimple formation means, as in the first and second embodiments described above. Additionally arranged on the downstream side of stamping machine 101 is a pinching portion 114 as the height adjustment means for adjusting the height of dimple 10 formed by stamping machine 101. Pinching portion 114 is formed of a pair of pinching blocks 114a, 114b. A collecting roller 116 as means for rolling up resin film 8 is further arranged on the downstream side of pinching blocks 114a, 114b.

(Height Adjustment Means)

Referring to FIGS. 15 and 16, pinching blocks 114a, 114b as the height adjustment means are positioned to face each other, spaced apart by a predetermined distance $h_{11}$, in a direction crossing the surface of resin film 8 being sent out by a driving roller 112. As such, resin film 8 having dimples 10 formed on its surface passes through the gap formed between pinching blocks 114a, 114b. Dimples 10 formed using stamping machine 101 have a height $h_{12}$ suffering some dimensional errors. Pinching blocks 114a, 114b as the height adjustment means are used to correct such a dimensional error.

Specifically, as shown in FIG. 16, when height $h_{12}$ of the dimple before being passed through pinching blocks 114a, 114b is greater than the distance $h_{11}$ of the gap between pinching blocks 114a, 114b, then the height of dimple 10 is forcibly adjusted as it is pinched between the blocks, to a desired height $h_{13}$.

(Effects)

As such, dimples 10 formed on the surface of resin film 8 are shaped to have the equal heights, and accordingly, a regenerator having a shape as designed can be formed with ease. If pinching blocks 114a, 114b are configured to be movable in the vertical direction (shown by an arrow C in the figure), they can easily address the case where there is a change in height of dimple 10 to be adjusted using pinching blocks 114a, 114b.

Fourth Embodiment

Figure 17:
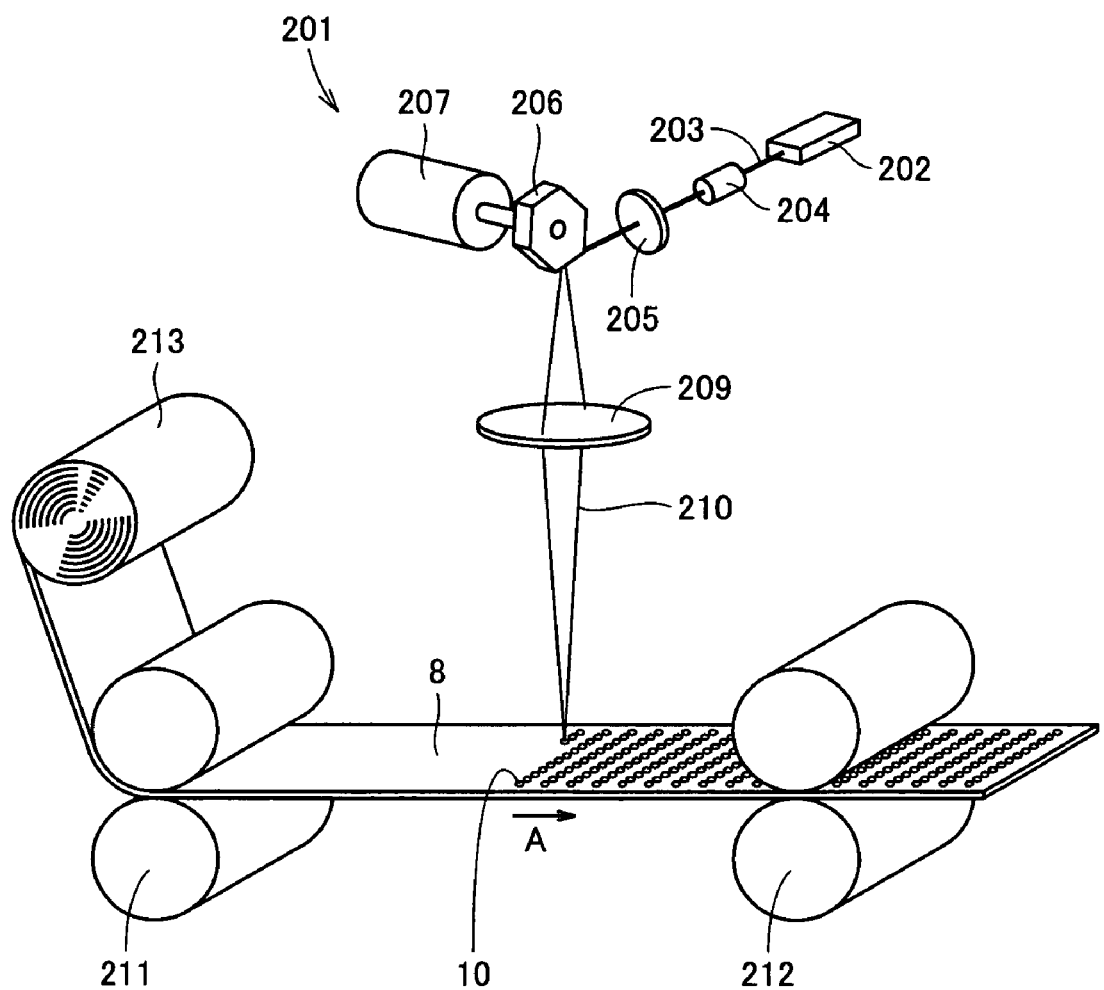
FIG. 17 is a schematic diagram illustrating a manufacturing method and apparatus of a regenerator according to a fourth embodiment of the present invention.
Figure 18A:
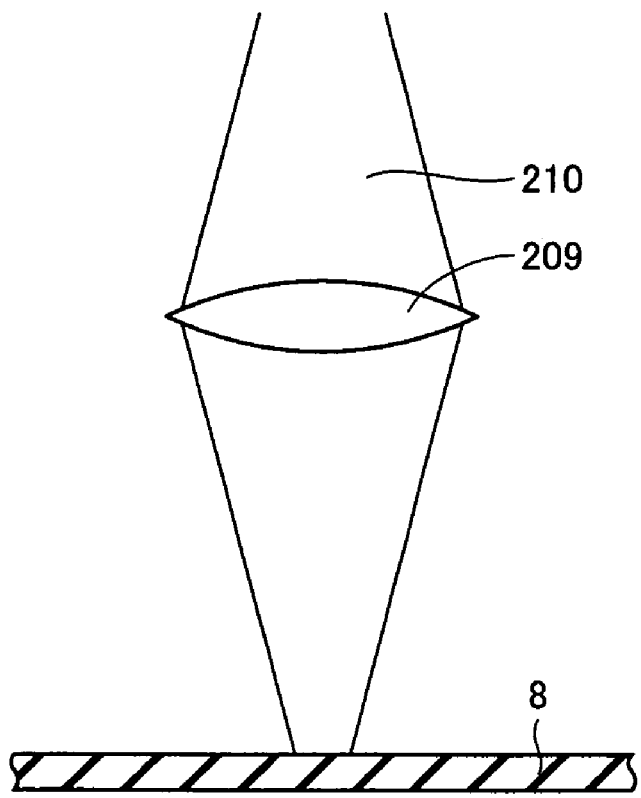
FIG. 18A is a schematic diagram illustrating how a dimple is formed on a surface of a resin film constituting the regenerator in the fourth embodiment of the present invention.
Figure 18B:
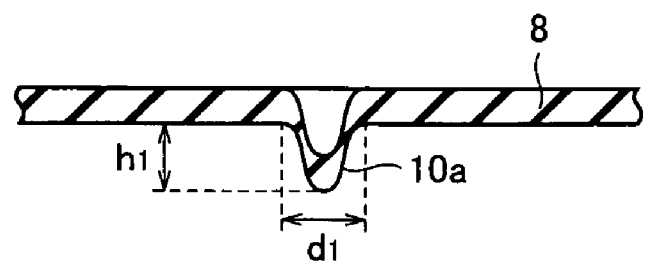
FIG. 18B is an enlarged cross sectional view of a resin film showing a shape of the dimple that is formed using the manufacturing method and apparatus of a regenerator according to the fourth embodiment of the present invention.
Figure 18C:
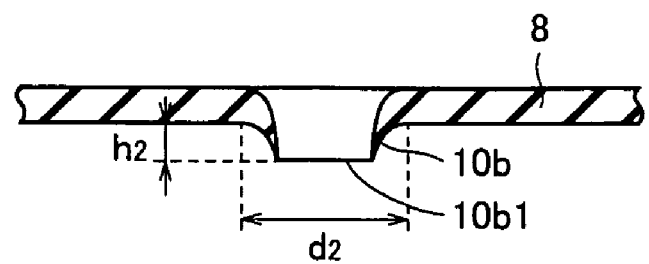
FIG. 18C is an enlarged cross sectional view of a resin film showing another shape of the dimple that is formed using the manufacturing method and apparatus of a regenerator according to the fourth embodiment of the present invention.

FIG. 17 is a schematic diagram illustrating a manufacturing method and apparatus of a regenerator according to a fourth embodiment of the present invention. FIG. 18A is a schematic diagram illustrating how a dimple is formed with the manufacturing method and apparatus of a regenerator according to the present embodiment. FIGS. 18B and 18C illustrate shapes of the dimples being formed by the manufacturing method and apparatus of a regenerator according to the present embodiment.

(Manufacturing Apparatus of Regenerator)

Firstly, the manufacturing apparatus of a regenerator according to the present embodiment is described with reference to FIG. 17. As shown in FIG. 17, the manufacturing apparatus of a regenerator of the present embodiment includes, among others, a film feeder 213 as the sending means for sending out a resin film, and laser beam irradiation means 201 as the dimple formation means. A laser beam 203 to be directed from laser beam irradiation means 201 to resin film 8 is emitted in pulses from a laser oscillator 202 as the light source. Laser beam 203 emitted from laser oscillator 202 is passed through a modulator 204, a beam expander 205, a polygon mirror 206 driven by a motor 207, and a condenser scanning lens 209, during which it is converted to a spot-shaped laser beam serving as a line scanning beam 210.

(Dimple Formation Step)

A way of forming a dimple on the surface of the resin film using the manufacturing apparatus of a regenerator configured as above is now explained. Referring to FIG. 17, line scanning beam 210 is emitted in pulses at prescribed power, while being converged on resin film 8 that is provided from film feeder 213 and moved in a horizontal direction (shown by an arrow A in the figure) at a constant speed by driving rollers 211, 212. As such, dimples 10 are formed continuously on the surface of resin film 8. The positioning step of sending out the resin film with film feeder 213 and determining the relative positions of laser beam irradiation means 201 and resin film 8, and the dimple formation step of irradiating an intended region for forming dimple in resin film 8 with a laser beam by laser beam irradiation means 201 to form dimple 10 on the surface of resin film 8, are conducted alternately, to enable continuous formation of dimples 10 on the surface of resin film 8.

If irradiation of line scanning beam 210 is continued even after beginning of plastic deformation, an opening 10$b$1 as shown in FIG. 18C will be formed at the surface of resin film 8. This is because the center of the portion of resin film 8 irradiated with line scanning beam 210 begins to melt as the temperature exceeds the melting point of resin film 8, thereby creating a hole in resin film 8. At this time, the surface tension works from the periphery, so that a dimple 10$b$ having its peripheral portion raised in an annular shape is obtained.

(Laminating Step and Mounting Step)

After the above-described dimple formation step, the resin film having a great number of dimples formed on its surface is cut into a prescribed length and wound around a cylindrical bobbin, as in the first embodiment described above. This forms a flow passage as the gap between the layers of the stacked resin film, through which the working gas can flow. The bobbin and the resin film wound around it constitute the regenerator for the Stirling refrigerator, which is then incorporated into a prescribed position of the Stirling engine in a manner similar to that of the conventional case described above.

(Effects)

When the regenerator for a Stirling refrigerator is manufactured using the manufacturing method and apparatus of a regenerator as described above, the dimples can be formed continuously on the surface of the resin film with ease and at low cost. This can simplify the manufacture of the Stirling refrigerator to a great extent. Further, as the dimples are formed by plastic deformation of the resin film in itself, they are formed with good reproducibility and with ease compared to the case where the dimples are formed in the conventional manner by bonding spacers or by performing silkscreen printing. Thus, a regenerator of good heat exchange efficiency as well as a Stirling refrigerator of high efficiency can be provided inexpensively. Further, when the dimples are mechanically formed by stamping with the stamping die as in the first through third embodiments above, fine dust may possibly occur. By comparison, in the present embodiment, the possibility of occurrence of the fine dust is eliminated, and thus, it is possible to provide a highly reliable regenerator exhibiting excellent heat exchange efficiency.

EXAMPLE

A specific example when forming dimples with the above-described method using laser beam is given. In the present example, polyethylene terephthalate grown to a thickness of 60 μm was used as the resin film for constituting the regenerator. As the laser beam for irradiating the resin film, YAG laser (yttrium-aluminum-garnet laser) having a wavelength of 1064 nm was used, with a spot diameter of φ0.3 mm, irradiation power of 50 mW, and irradiation time of 0.1 second. In this case, it was confirmed that the resin film experienced only plastic deformation, resulting in formation of a dimple 10$a$ as shown in FIG. 18B. Dimple 10$a$ at this time had a diameter $d_1$ of about 0.4 mm at the bottom, and a height $h_1$ of about 100 μm. It was a fine dimple in an approximately V shape.

Of the above-described conditions, the irradiation time was changed to 0.15 second. It was then confirmed that a dimple 10$b$ having an opening 10$b$1 as shown in FIG. 18C was formed. Dimple 10$b$ at this time had a diameter $d_2$ of about 0.5 mm at the bottom, and a height $h_2$ of about 85 μm. It was a fine, annular dimple.

As described above, it has been confirmed that dimples of various sizes and shapes can be formed by controlling the spot diameter, irradiation power, and irradiation time of the laser beam irradiating the resin film. Further, it has also been confirmed that the dimple can be formed with desired size and shape with good reproducibility using the method of the present embodiment.

Fifth Embodiment

Figure 19A:
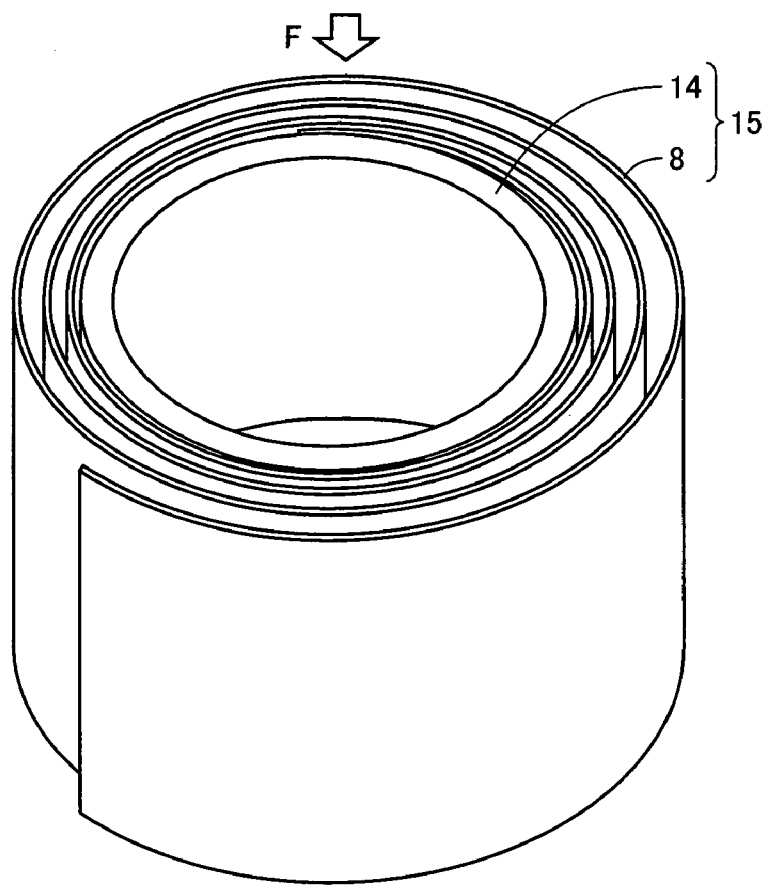
FIG. 19A is a schematic perspective view illustrating a structure of a regenerator according to a fifth embodiment of the present invention.
Figure 19B:
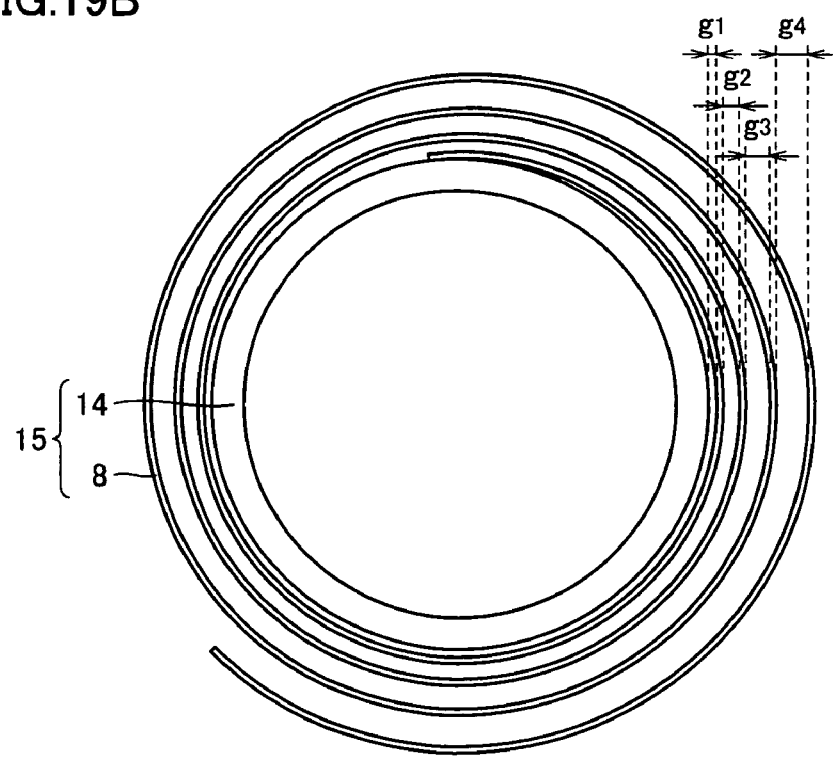
FIG. 19B is a schematic top plan view illustrating the structure of the regenerator according to the fifth embodiment of the present invention.

FIG. 19A is a schematic perspective view of a structure of a regenerator according to a fifth embodiment of the present invention, and FIG. 19B is a schematic top plan view of the regenerator when seen from the direction shown by an arrow F in FIG. 19A. In the present embodiment, heights of the dimples are changed in different positions. The dimples are not shown in the figures.

(Structure of Regenerator)

In the present embodiment, the dimples formed on the surface of resin film 8 are made to gradually increase in height toward the drawn direction of resin film 8. FIGS. 19A and 19B show the state where resin film 8 formed to have such a pattern is wound around bobbin 14. It is shown that the gap between the neighboring layers of the resin film stacked by winding is increased toward the outside. That is, in FIG. 19B, the heights of the gaps between the neighboring layers hold the following relation: $g_1 < g_2 < g_3 < g_4$.

(Functions and Effects)

In general, the heat flux flowing into and out of the regenerator is not constant in the height direction of the regenerator. It is known that in a Stirling refrigerator having the above-described structure, the greater heat flux is obtained in the outer periphery than in the inner region of the regenerator. Thus, by adjusting the heights of the dimples determining the gap heights in accordance with distribution of the heat flux, the heat exchange performance between the working gas and the resin film can be increased, and accordingly, the heat accumulation/radiation performance of the regenerator film can considerably be improved.

For manufacture of the regenerator of this type, the method of forming the dimples by stamping as shown in the first embodiment above, for example, may be employed. The method of forming the dimples by laser beam irradiation as shown in the fourth embodiment above may be employed as well. In the method of forming the dimples with laser beam irradiation, for example, the gap heights may be adjusted by gradually increasing the power or time of irradiation of the laser in synchronization with the feeding of the resin film to increase the heights of the dimples.

Sixth Embodiment

Figure 20:
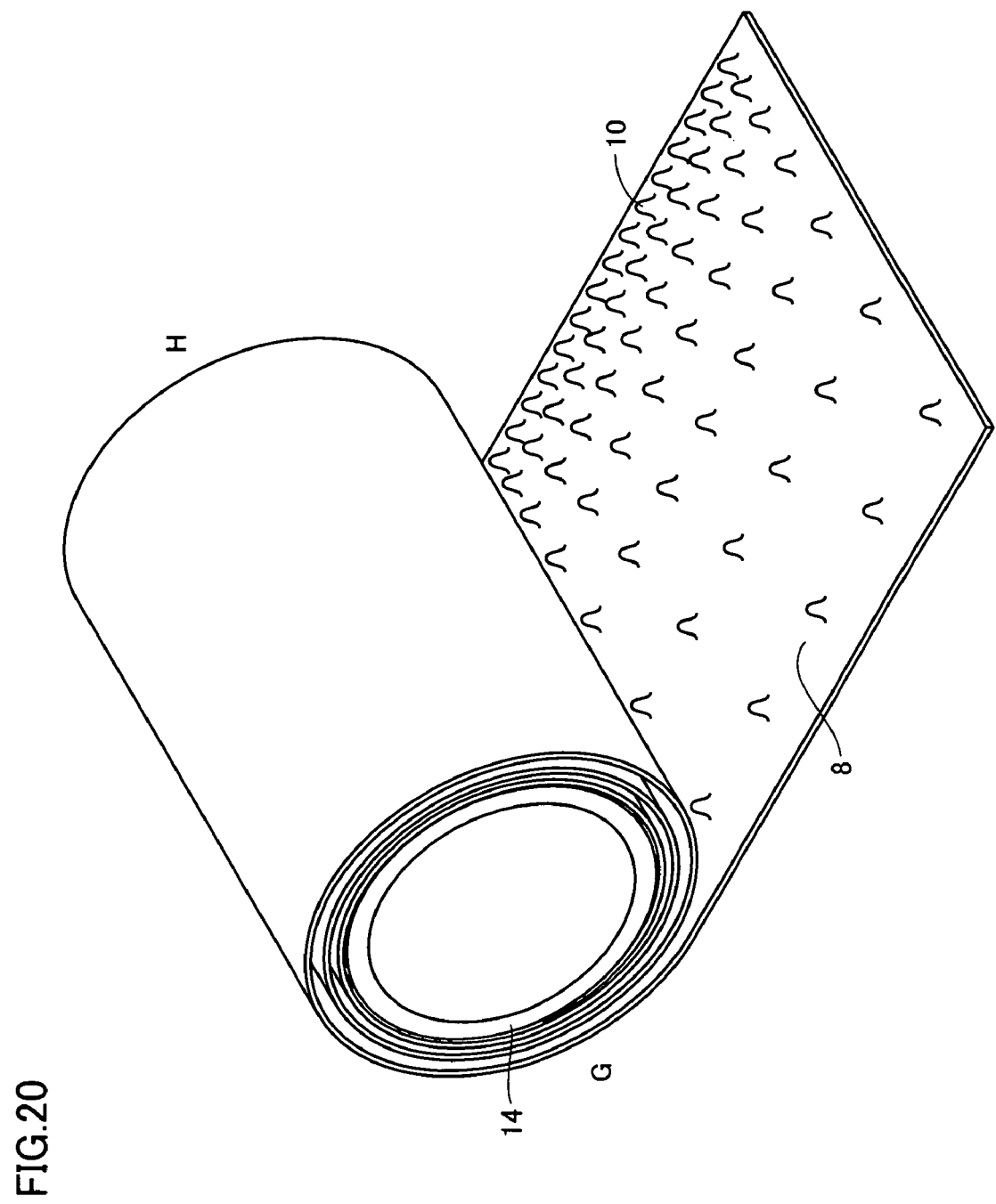
FIG. 20 is a schematic perspective view illustrating distribution of dimples on a resin film constituting the regenerator according to a sixth embodiment of the present invention.

FIG. 20 is a schematic perspective view of a structure of a regenerator according to a sixth embodiment of the present invention. The present embodiment shows an example of a dimple formation pattern where the heights of the dimples formed on the surface of the resin film are continuously changed such that they gradually become higher toward the drawn direction of the resin film, and at the same time, the number of the dimples per unit area is differentiated between the compression space side and the expansion space side.

(Structure of Regenerator)

Referring to FIG. 20, in the regenerator of the present embodiment, the number of dimples 10 per unit area is greater on the expansion space side (on the side of H in the figure) than on the compression space side (on the side of G in the figure). The gap between the layers of resin film 8 stacked as wound around bobbin 14 becomes wider as it approaches the outer periphery. Dimples 10 inside are likewise denser toward the expansion space side.

(Functions and Effects)

The working gas flowing in the regenerator is at a lower temperature on the expansion space side and at a higher temperature on the compression space side. The working gas of lower temperature on the expansion space side is low in viscosity and easily flows. Thus, securing a large heat transfer area can improve the heat exchange efficiency of the regenerator, although the flow resistance may increase by a certain degree. On the other hand, the working gas of higher temperature on the compression space side is high in viscosity. Thus, for the purpose of improving the heat exchange efficiency of the regenerator, it is better to give preference to reduction of the flow resistance over increase of the heat transfer area.

In view of the foregoing, in the present embodiment, the number of dimples per unit area is increased toward the expansion space side and decreased toward the compression space side. This makes the flow resistance of the working gas approximately uniform over the entire regenerator, thereby ensuring smooth and uniform flow of the gas. As a result, the heat accumulation performance of the regenerator is further improved. If the regenerator is to be produced using the dimple formation method by laser beam irradiation as described in the fourth embodiment above, the intervals of pulse irradiation at the time of laser scanning may be set relatively longer on the compression space side than on the expansion space side.

Seventh Embodiment

Figure 21:
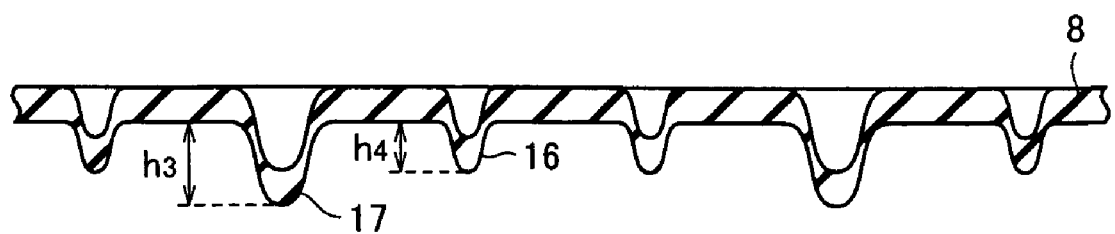
FIG. 21 is a schematic cross sectional view illustrating a shape of a resin film as the regenerator according to a seventh embodiment of the present invention.
Figure 22:
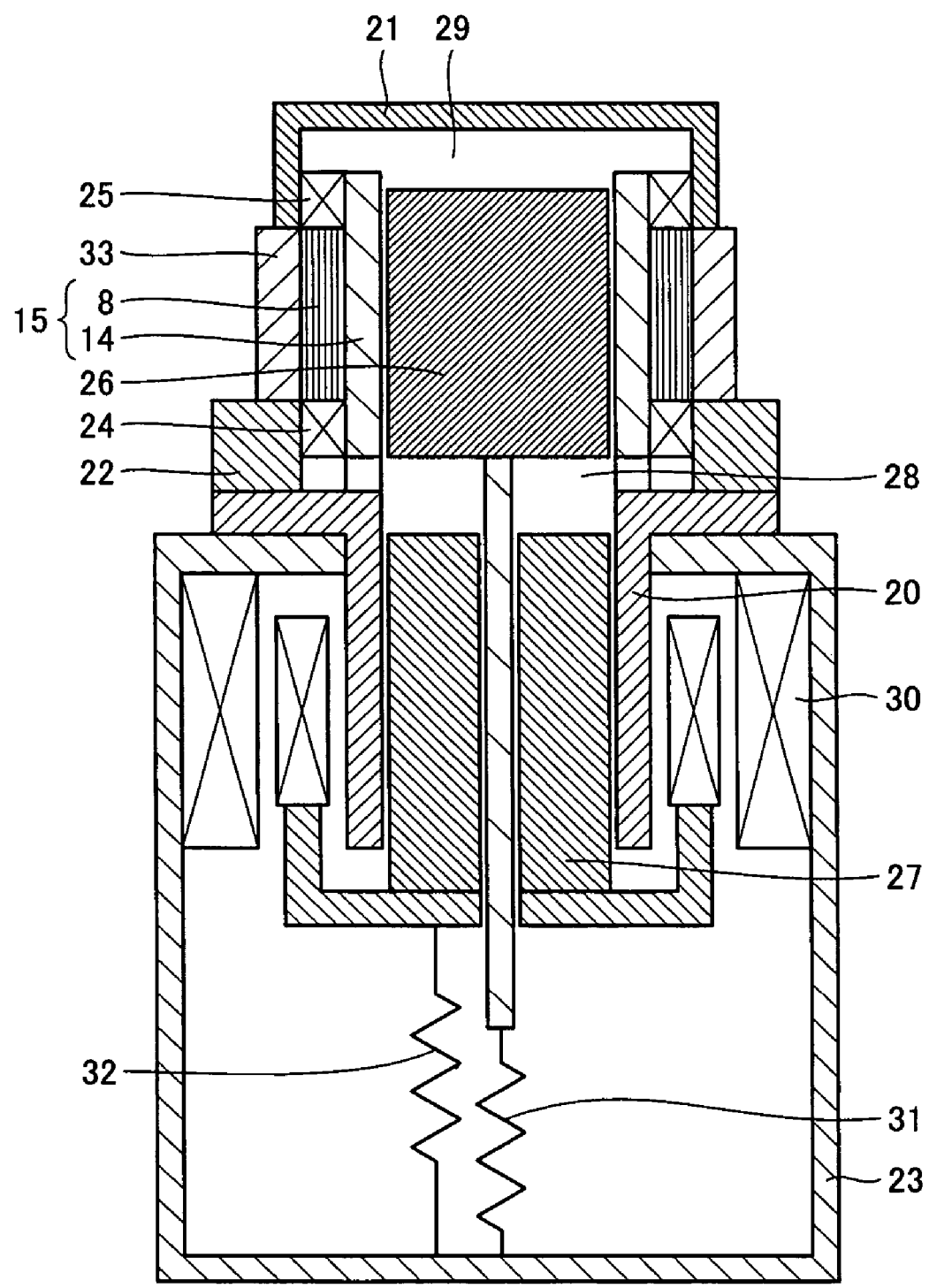
FIG. 22 is a cross sectional view illustrating a structure of a conventional Stirling refrigerator.
Figure 23A:
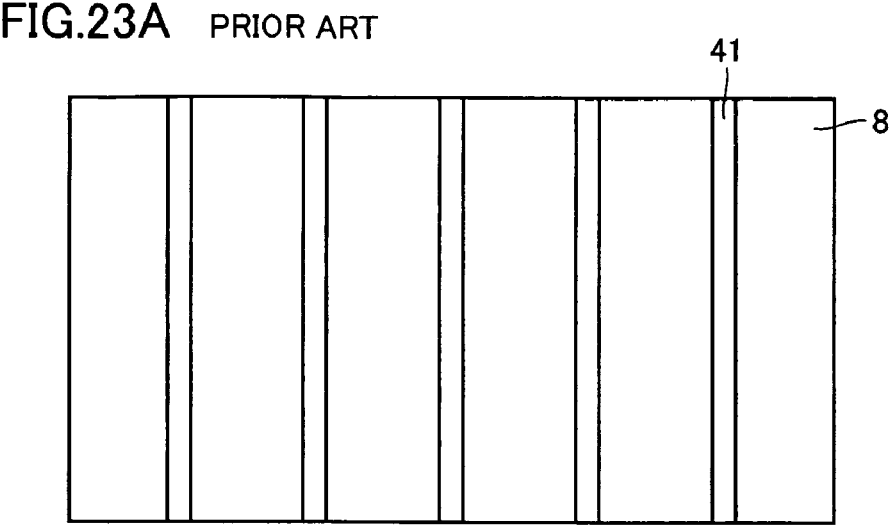
FIG. 23A is a top plan view of a resin film having dimples formed thereon by bonding a plurality of spacers.
Figure 23B:
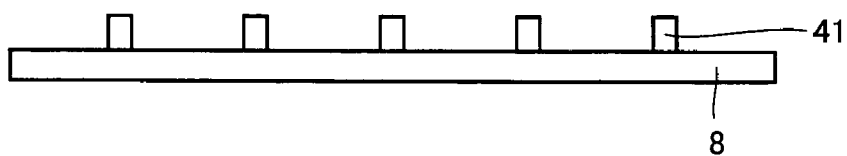
FIG. 23B is an end face view of the resin film shown in FIG. 23A.
Figure 24A:
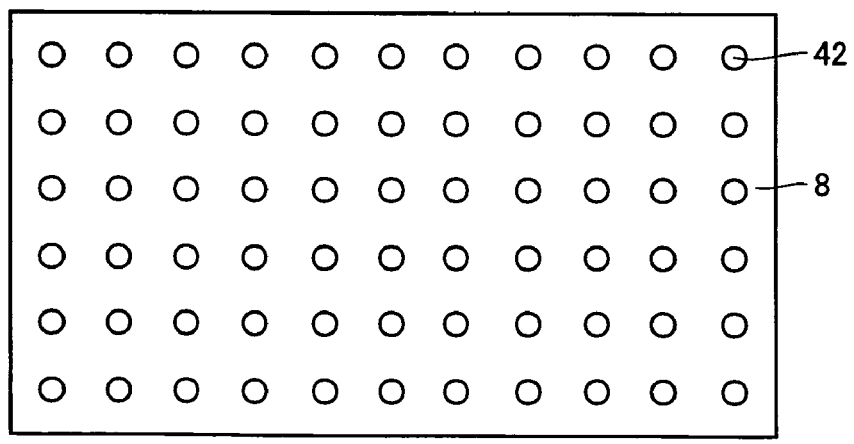
FIG. 24A is a top plan view of a resin film having dimples formed thereon by silkscreen printing.
Figure 24B:
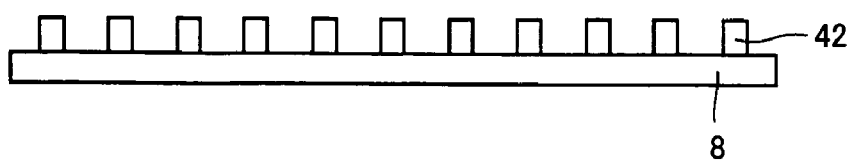
FIG. 24B is an end face view of the resin film shown in FIG. 24A.
Figure 25:
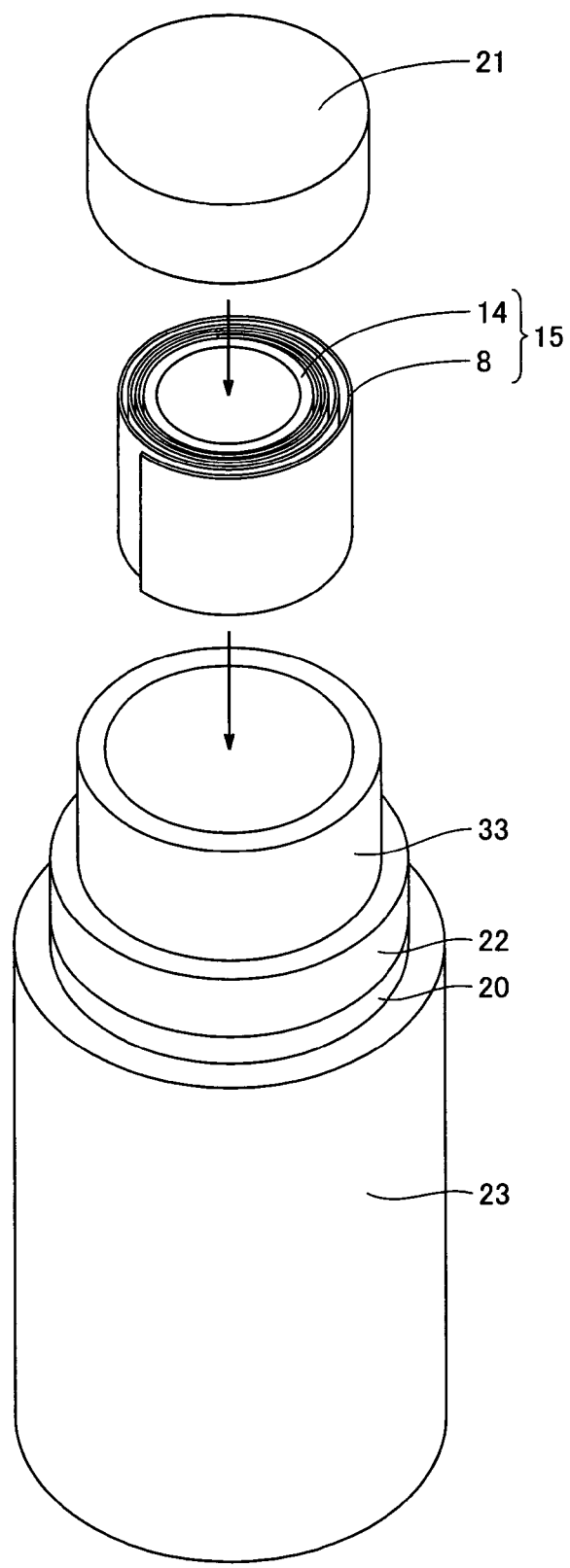
FIG. 25 is a developed perspective view illustrating a structure of a conventional Stirling refrigerator.

FIG. 21 is a schematic cross sectional view showing shapes of dimples formed on the resin film according to a seventh embodiment of the present invention. The present embodiment shows an example of a dimple formation pattern where two types of dimples are formed on the surface of the resin film, one being those for separating the layers of the stacked film and the other being those for ensuring a larger heat transfer area.

(Structure of Regenerator)

Referring to FIG. 21, in the regenerator according to the present embodiment, the dimples formed on the surface of resin film 8 have different heights. Larger dimples 17 are for separating the layers of the stacked film from each other, and smaller dimples 16 are for ensuring a larger heat transfer area. Here, their heights hold the relation of $h_3 > h_4$.

(Functions and Effects)

The use of the present pattern can increase the heat transfer area while suppressing the flow resistance with respect to the working gas flowing in the regenerator. Thus, it is possible to improve the heat exchange efficiency with the working gas flowing through the regenerator. If this regenerator is to be formed using the dimple formation method by laser beam irradiation in the fourth embodiment above, power or time of laser irradiation may be changed at a constant period in synchronization with the laser irradiation scanning.

In the first through seventh embodiments above, a resin film stacked as wound in a cylindrical shape has been given as an example of the stacked structure of the resin film. This configuration enables production of a regenerator with ease and at low cost, compared to the case of producing a regenerator by cutting or bending a resin member. The regenerator of the present invention however is not limited to this configuration. The resin film may be cut and stacked one another, or may be bent to achieve the stacked structure.

In the first through seventh embodiments above, a resin film having its surface applied with no coating has been explained by way of example. Alternatively, it may be coated in advance with metal thin film of high heat conductivity, such as gold, silver, copper, aluminum, carbon or the like. In this case, if the laser beam irradiation means is used as the dimple formation means, high-speed irradiation and high-speed feeding become possible with efficient absorption of the laser beam, so that productivity is further improved and heat accumulation/radiation performance as the regenerator is improved as well.

In the first through third embodiments above, a stamping die having a plurality of needles arranged in a line has been explained by way of example. Not specifically limited thereto, a stamping die having a single needle, a stamping die having a plurality of rows of needles, and other stamping dies of various shapes may also be employed.

In the fourth embodiment above, the laser scanning mechanism has been provided with a polygon mirror. Not limited thereto, a galvanometer mirror, an ultrasonic light deflector and others may also be employed.

The height adjustment means in the third embodiment above is of course applicable to the other embodiments as well.

The layout patterns of dimples, and the shapes, heights, sizes and densities of the dimples explained in the respective embodiments above are applicable to almost all of the regenerators produced according to the present invention, not limited to the one formed using particular dimple formation means.

Further, in the first through seventh embodiments above, a regenerator to be incorporated in a Stirling refrigerator has been explained by way of example. The present invention however is not specifically limited thereto. Rather, the present invention is applicable to any regenerator formed by stacking a resin film, and naturally applicable to any apparatus incorporating the regenerator therein.

As explained above, it should be understood that the embodiments disclosed herein are illustrative and non-restrictive in every respect. The technical scope of the present invention is defined by the terms of the claims, and is intended to include any modifications within the scope and meaning equivalent to the terms of the claims.

INDUSTRIAL APPLICABILITY

According to the present invention, it is possible to provide a regenerator that is highly reliable, easy and inexpensive to manufacture, and exhibits high heat exchange efficiency, an apparatus for manufacturing the regenerator, and a Stirling refrigerator provided with the regenerator.

Further, according to the present invention, it is possible to provide an apparatus for manufacturing a regenerator that ensures an increased degree of design freedom of projections to be formed on a resin film constituting the regenerator and allows the projections to be formed with good reproducibility and with a high degree of accuracy.

The invention claimed is:

1. A regenerator disposed on a flow passage for a working gas, formed by stacking a film-shaped resin member in a direction crossing a flow direction of the working gas, said resin member including a projection formed by subjecting a surface of said resin member to plastic deformation and having an opening on its tip, and said projection providing a gap between layers of said stacked resin member.

2. The regenerator according to claim 1, wherein on the surface of said resin member, the projection in a prescribed region is adjusted to have a height different from a height of the projection in another region.

3. The regenerator according to claim 1, wherein said regenerator is arranged between a compression space and an expansion space of a Stirling refrigerator, and on the surface of said resin member, the number of the projections per unit area is increased as the distance from said expansion space decreases, compared to the side of said compression space.

4. A Stirling refrigerator, provided with a regenerator that is disposed on a flow passage for a working gas and is formed by stacking a film-shaped resin member in a direction crossing a flow direction of the working gas, said resin member including a projection formed by subjecting a surface of said resin member to plastic deformation and having an opening on its tip, and said projection providing a gap between layers of said stacked resin member.

5. The Stirling refrigerator according to claim 4, wherein on the surface of said resin member, the projection in a prescribed region is adjusted to have a height that is different from a height of the projection in another region.

6. The Stirling refrigerator according to claim 4, wherein said Stirling refrigerator includes a compression space and an expansion space, and on the surface of said resin member, the number of the projections per unit area is increased as the distance from said expansion space decreases, compared to the side of said compression space.

* * * * *